US011267074B2

(12) United States Patent
Vorontsov et al.

(10) Patent No.: US 11,267,074 B2
(45) Date of Patent: Mar. 8, 2022

(54) ADDITIVE MANUFACTURING IN METALS WITH A FIBER ARRAY LASER SOURCE AND ADAPTIVE MULTI-BEAM SHAPING

(71) Applicant: II-VI Delaware Inc., Wilmington, DE (US)

(72) Inventors: Mikhail A. Vorontsov, Dayton, OH (US); Abtin Ataei, Oakwood, OH (US)

(73) Assignee: II-VI DELAWARE INC., Wilmington, DE (US)

( * ) Notice: Subject to any disclaimer, the term of this patent is extended or adjusted under 35 U.S.C. 154(b) by 0 days.

(21) Appl. No.: 16/901,612

(22) Filed: Jun. 15, 2020

(65) Prior Publication Data

US 2020/0306880 A1 Oct. 1, 2020

Related U.S. Application Data

(63) Continuation-in-part of application No. 15/983,866, filed on May 18, 2018, now Pat. No. 11,117,218.
(Continued)

(51) Int. Cl.

| | |
|---|---|
| *B23K 26/082* | (2014.01) |
| *B29C 64/153* | (2017.01) |
| *B29C 64/236* | (2017.01) |
| *B29C 64/268* | (2017.01) |
| *B23K 26/08* | (2014.01) |

(Continued)

(52) U.S. Cl.
CPC ........ *B23K 26/082* (2015.10); *B23K 26/0648* (2013.01); *B23K 26/0876* (2013.01); *B29C 64/153* (2017.08); *B29C 64/236* (2017.08); *B29C 64/245* (2017.08); *B29C 64/268* (2017.08); *B33Y 10/00* (2014.12); *B33Y 30/00* (2014.12)

(58) Field of Classification Search
CPC .............. B23K 26/032; B23K 26/0676; B23K 26/0006; B23K 26/0876; B23K 26/044; B23K 26/082; B23K 26/0626; B23K 26/0608; B23K 26/0342; B33Y 30/00; B33Y 10/00; G02B 6/02052; G02B 6/3504; G02B 6/4249; G02B 2006/0098
See application file for complete search history.

(56) References Cited

U.S. PATENT DOCUMENTS

| | | | | |
|---|---|---|---|---|
| 2002/0181844 A1* | 12/2002 | Vaganov | ............ | H04Q 11/0005 385/17 |
| 2003/0063838 A1* | 4/2003 | Hagood | ................... | G02B 6/32 385/16 |
| 2016/0216510 A1* | 7/2016 | Tsuruta | .............. | G01N 21/6456 |

* cited by examiner

*Primary Examiner* — Brian W Jennison
(74) *Attorney, Agent, or Firm* — Blank Rome LLP

(57) ABSTRACT

A system that uses a scalable array of individually controllable laser beams that are generated by a fiber array system to process materials into an object. The adaptive control of individual beams may include beam power, focal spot width, centroid position, scanning orientation, amplitude and frequency, of individual beams. Laser beam micro scanner modules (MSMs) are arranged into 2D arrays or matrices. During operation of the MSMs, a fiber tip that projects the laser beam is displaced along the x and y-axis in order to scan the focal spot. Each MSM within a matrix can process a corresponding cell (e.g., one square centimeter) during focal spot scanning, and the plurality of MSMs may be operated in parallel to process a plurality of corresponding cells (e.g., with a 10×10 matrix of MSM, 100 cm²) without rastering or otherwise repositioning the assembly over the build surface.

20 Claims, 27 Drawing Sheets

Related U.S. Application Data which is a continuation-in-part of application No. 15/642,884, filed on Jul. 6, 2017, now Pat. No. 10,589,377.

(51) Int. Cl.
*B23K 26/06* (2014.01)
*B29C 64/245* (2017.01)
*B33Y 30/00* (2015.01)
*B33Y 10/00* (2015.01)

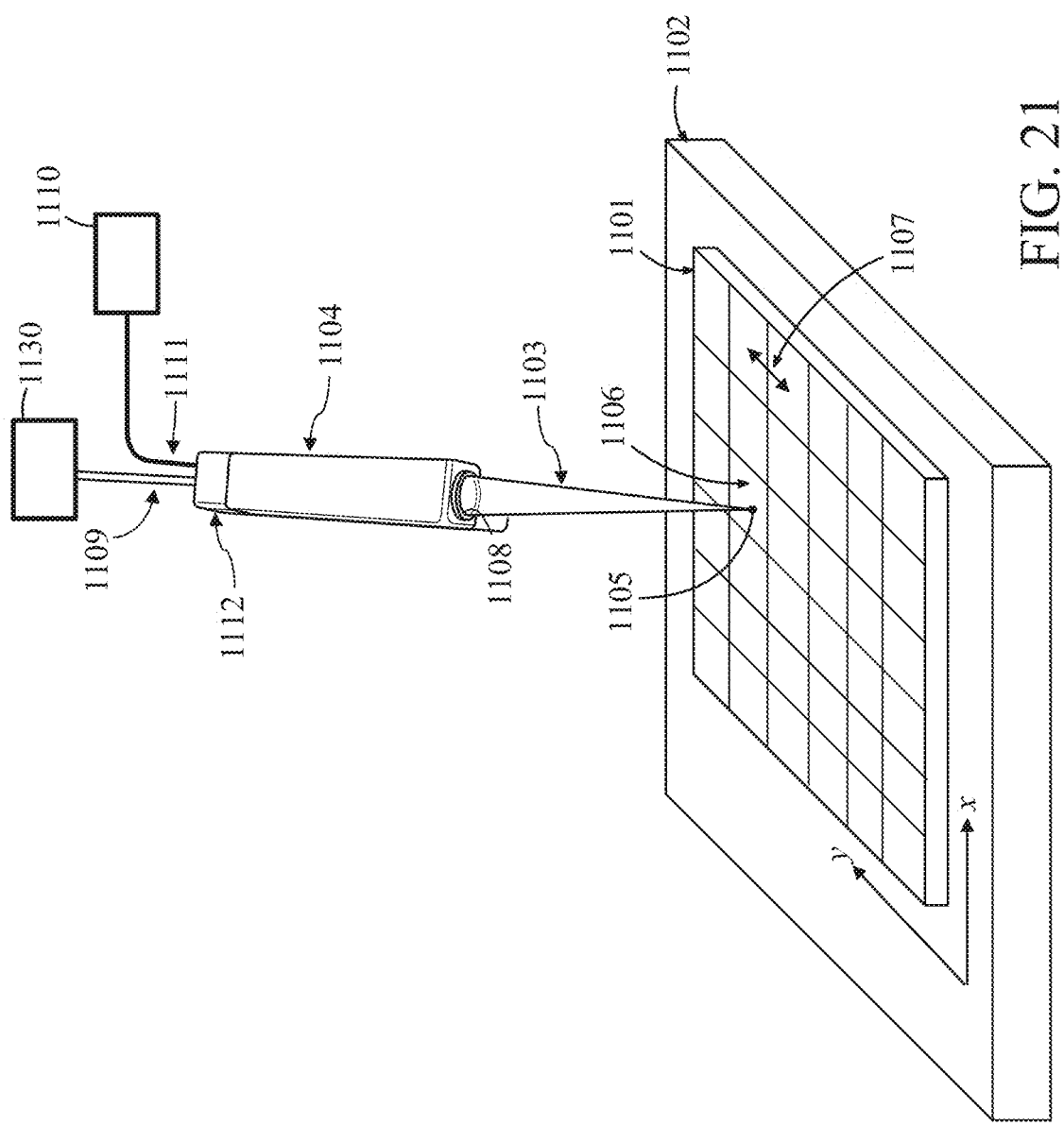

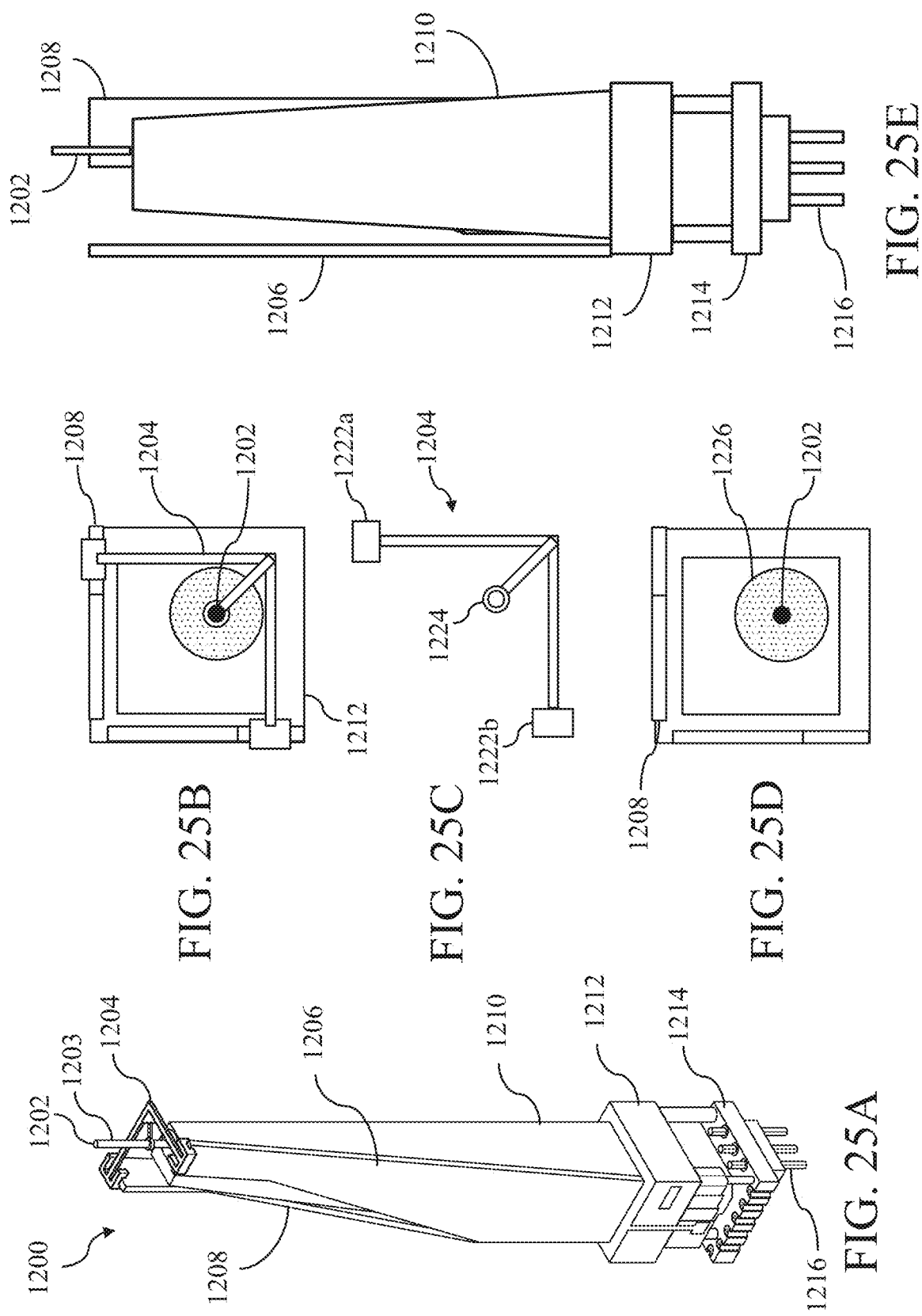

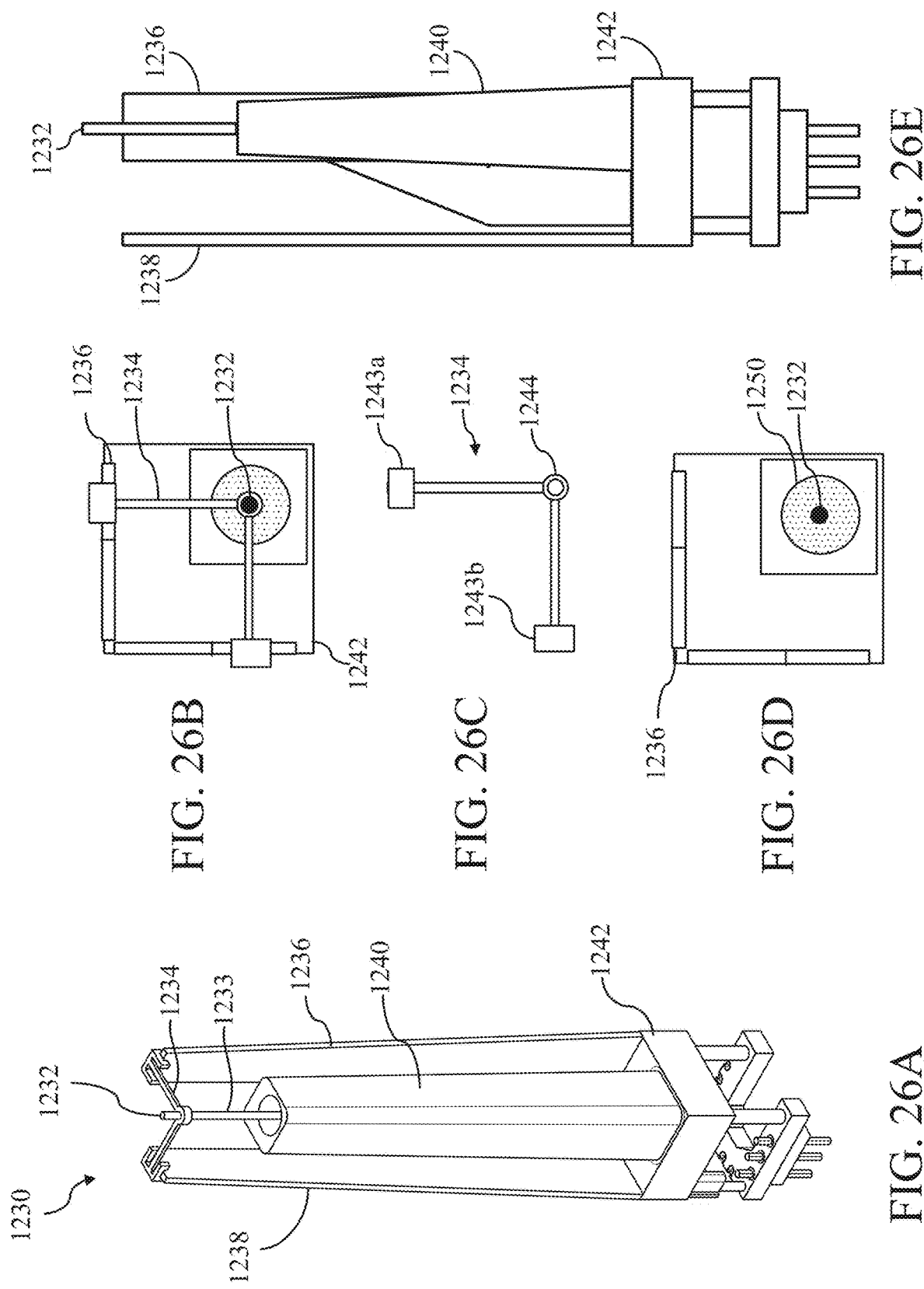

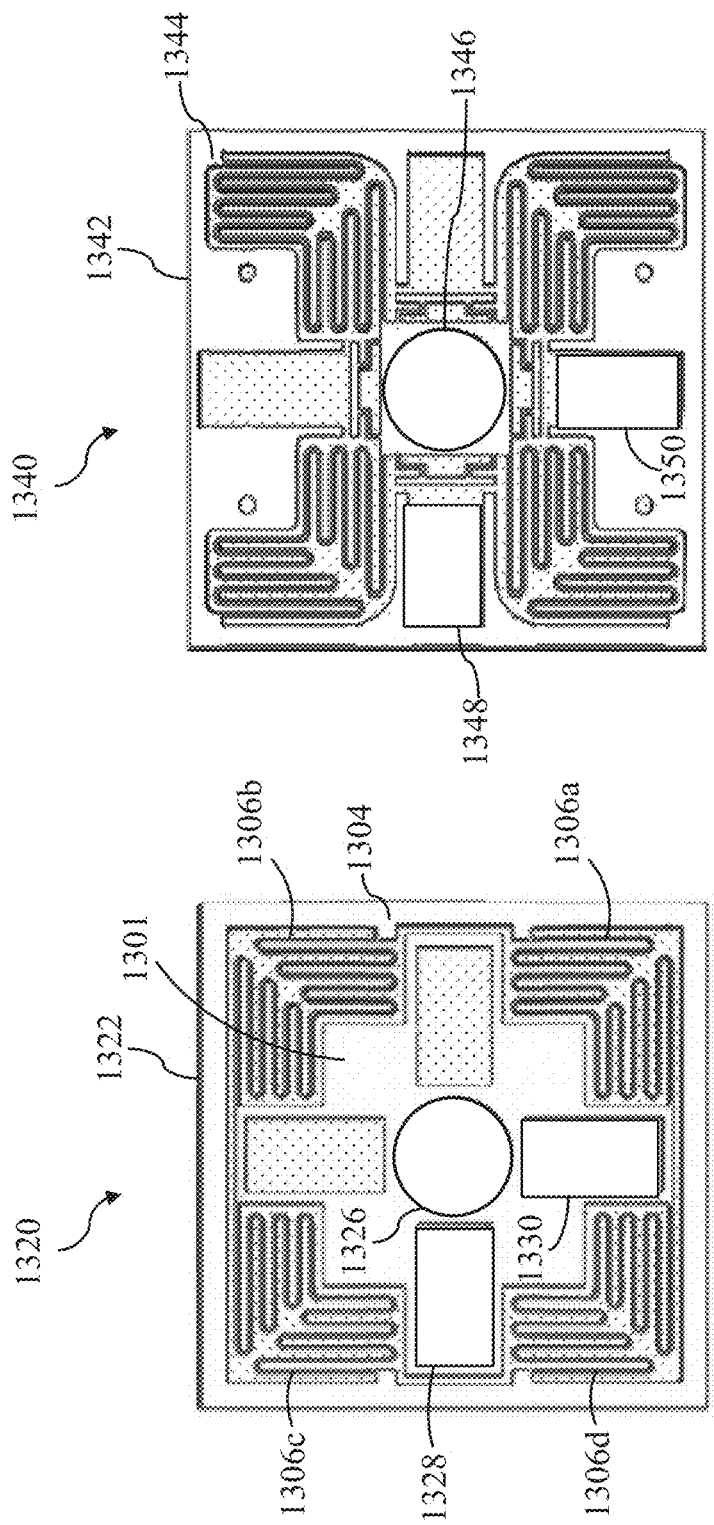

ADDITIVE MANUFACTURING IN METALS WITH A FIBER ARRAY LASER SOURCE AND ADAPTIVE MULTI-BEAM SHAPING

PRIORITY

This application is a continuation in part of U.S. non-provisional patent application Ser. No. 15/983,866, filed May 18, 2018, and entitled "Additive Manufacturing in Metals with a Fiber Array Laser Source and Adaptive Multi-Beam Shaping," which itself is a continuation in part of U.S. non-provisional patent application Ser. No. 15/642,884, filed Jul. 6, 2017, and entitled "Additive Manufacturing in Metals with a Fiber Array Laser Source and Adaptive Multi-Beam Shaping."

FIELD

The disclosed technology pertains to systems for metal additive manufacturing using a multi-beam fiber array laser power source with adaptive shaping of spatiotemporal laser power distribution, and in situ sensing systems.

BACKGROUND

Lasers are a common power source for material processing and metal additive manufacturing, such as laser additive manufacturing (LAM) technologies. As one example, metal powder bed LAM involves a manufacturing platform or bed that can be raised and lowered during the manufacturing process. A thin layer of metal powder is evenly spread across the bed, and then a laser is used to heat the metal powder in a desired pattern so that it melts and then cools, while the unaffected powder material can be brushed away, leaving only the newly formed layer. After each layer is formed by the laser, the powder platform is lowered and a new layer of metal powder is spread on top of the old layer. In this manner, a three-dimensional object can be formed, one layer at a time, by lowering the platform, adding a new powder layer, and then using the laser to melt the powder in the shape of a desired object volume into the new powder layer, where it then cools, consolidates into metal and bonds with the previous layer. The major drawbacks of existing laser power sources for LAM are the lack of active and/or adaptive control of the laser beam spatiotemporal characteristics during laser energy deposition and lack of appropriate in situ sensing techniques for characterization of both stock material in front of the processing beam and melted and consolidated into metal materials inside the processing beam and the heat affected zone (HAZ), during and after LAM processing of each layer. The lack of such real-time sensing techniques prevents development and implementation of the beam control techniques including, programmable, feedforward and feedback control of LAM processes to improve productivity, repeatability and quality of LAM-built products and components.

SUMMARY

Examples described herein include an additive manufacturing system comprising: (a) a laser beam scanning matrix including a plurality of micro scanner modules assembled in a matrix pattern having at least two rows and at least two columns, wherein each micro scanner module includes: (i) a fiber tip; (ii) a lens positioned on an optical axis of the fiber tip; and (iii) a laser beam scanning element operable to selectively change the position of the fiber tip or the lens in at least two dimensions; (b) a fiber laser source operable to selectively provide laser power to the fiber tips of the plurality of micro scanner modules; (c) a build surface including a powder layer; and (d) one or more processors configured to (i) receive an object definition that describes a work piece; (ii) determine, based on the object definition and for each of the plurality of micro scanner modules, a set of cell specific operations for processing the powder layer in a cell of the build surface that corresponds to that micro scanner module; and (iii) for each of the plurality of micro scanner modules, operate the fiber laser source and the laser beam scanning element based on the set of cell specific operations in order to process the powder layer within the corresponding cell for that micro scanner module.

Examples described herein include any one or more of the previous examples, further comprising a positioning system operable to position the laser beam scanning matrix relative to the build surface, wherein the processor is further configured to: (i) process a first plurality of cells of the build surface that correspond to each of the plurality of micro scanner modules when the laser beam scanning matrix and the build surface are in a first relative position; (ii) operate the positioning system to position the laser beam scanning matrix and the build surface in a second relative position; and (iii) process a second plurality of cells of the build surface that correspond to each of the plurality of micro scanner modules when the laser beam scanning matrix and the build surface are in the second relative position.

Examples described herein include any one or more of the previous examples, wherein: (a) each micro scanner module further comprises a base having a first dimensional length and a second dimensional length; and (b) the plurality of micro scanner modules are assembled in the matrix pattern so that each base is in contact with at least one other base, and an area of the matrix pattern is the product of the first dimensional length, the second dimensional length, and the number of the plurality of micro scanner modules.

Examples described herein include any one or more of the previous examples, wherein an area of each corresponding cell is the product of the first dimensional length and the second dimensional length.

Examples described herein include any one or more of the previous examples, wherein the laser beam scanning element of each of the plurality of micro scanner modules is configured to, based upon control signals, move a focal spot projected from the fiber tip onto the build surface along an x-axis and a y-axis to any coordinate within the area of the corresponding cell.

Examples described herein include any one or more of the previous examples, wherein the laser beam scanning element comprises: (a) a flexure coupled to an x-actuator, a y-actuator, and the fiber tip, and adapted to flexibly bias the fiber tip to a neutral position; (b) the x-actuator configured to displace the fiber tip in either direction along an x-axis in response to control signals; and (c) the y-actuator configured to displace the fiber tip in either direction along a y-axis in response to control signals.

Examples described herein include any one or more of the previous examples, further comprising an interface surface including a plurality of lenses positioned between the plurality of micro scanner modules and the build surface, wherein the lenses of the plurality of micro scanner modules are held in a static position by the lens interface surface.

Examples described herein include any one or more of the previous examples, wherein the flexure is configured to have a displacement potential of at least 2 mm.

Examples described herein include any one or more of the previous examples, wherein a shape of the flexure comprises a pair of long thin arms and a coupling of the flexure is offset from an intersection of the arms.

Examples described herein include any one or more of the previous examples, wherein the flexure is configured to have a displacement potential of at least 1.7 mm.

Examples described herein include any one or more of the previous examples, wherein the shape of the flexure comprises a pair of spring arms.

Examples described herein include any one or more of the previous examples, wherein the fiber tip is statically positioned, and the laser beam scanning element is operable to selectively change the position of the lens in at least two dimensions.

Examples described herein include any one or more of the previous examples, wherein the laser beam scanning element comprises an actuator flexure that includes: (a) a floating portion held by a set of flex arms within a base, and a lens holder, wherein the set of flex arms flexibly bias the floating portion to a neutral position and the lens holder holds the lens; (b) an x-actuator configured to displace the floating portion in either direction along an x-axis in response to control signals; and (c) a y-actuator configured to displace the floating portion in either direction along a y-axis in response to control signals.

Examples described herein include any one or more of the previous examples, wherein each of the x-actuator and the y-actuator comprise a linear actuator that is coupled to the floating portion and the base.

Examples described herein include a method for additive manufacturing comprising: (a) positioning a laser beam scanning matrix relative to a build surface, wherein the laser beam scanning matrix includes a plurality of micro scanner modules assembled in a matrix pattern having at least two rows and at least two columns, wherein each micro scanner module includes: (i) a fiber tip; (ii) a lens positioned on an optical axis of the fiber tip; and (iii) a laser beam scanning element operable to selectively change the position of the fiber tip or the lens in at least two dimensions; (b) determining, based on an object definition for a work piece, and for each of the plurality of micro scanner modules, a set of cell specific operations for processing a powder layer in a cell of the build surface that corresponds to that micro scanner module; (c) operating a fiber laser source to selectively provide laser power to the fibers tips of the plurality of micro scanner modules; and (d) for each of the plurality of micro scanner modules, operating the laser beam scanning element based on the set of cell specific operations in order to process the powder layer within the corresponding cell for that micro scanner module.

Examples described herein include any one or more of the previous examples, wherein: (a) each micro scanner module further comprises a base having a first dimensional length and a second dimensional length; and (b) the plurality of micro scanner modules are assembled in the matrix pattern so that each base is in contact with at least one other base, and an area of the matrix pattern is the product of the first dimensional length the second dimensional length, and the number of the plurality of micro scanner modules.

Examples described herein include any one or more of the previous examples, wherein operating the laser beam scanning element comprises: (a) providing control signals to an x-actuator to displace the fiber tip in either direction along an x-axis; and (b) providing control signals to a y-actuator to displace the fiber tip in either direction along a y-axis in response to control signals.

Examples described herein include any one or more of the previous examples, wherein a flexure couples the x-actuator and the y-actuator to the fiber tip, the method further comprising selecting a set of characteristics of the flexure to provide a displacement potential of at least 2 mm.

Examples described herein include any one or more of the previous examples, wherein operating the laser beam scanning element comprises: (a) providing control signals to an x-actuator to displace the lens in either direction along an x-axis; and (b) providing control signals to a y-actuator to displace the lens in either direction along a y-axis in response to control signals.

Examples described herein include a laser beam scanning matrix comprising a plurality of micro scanner modules assembled in a matrix pattern having at least two rows or at least two columns, wherein each micro scanner module includes: (a) a fiber tip; (b) a lens positioned on an optical axis of the fiber tip; (c) a laser beam scanning element operable to selectively change the position of the fiber tip or the lens in at least two dimensions; and (d) a base that defines a footprint of the micro scanner module; and (e) a control circuit configured to: (i) receive control signals; and (ii) operate the laser beam scanning element to displace a focal spot projected by the fiber tip to an x-y coordinate of a processing cell, wherein an area of the processing cell corresponds to an area of the footprint of the micro scanner module.

BRIEF DESCRIPTION OF THE DRAWINGS

The drawings and detailed description that follow are intended to be merely illustrative and are not intended to limit the scope of the invention as contemplated by the inventor.

FIG. 21 shows a schematic diagram of a micro-scanner module (MSM) of the MSLB of FIG. 20;

FIG. 25A shows a perspective view of an alternate exemplary MSM;

FIG. 25B shows a top down view of the MSM of FIG. 25A;

FIG. 25C shows a top down view of an exemplary flexure of the MSM of FIG. 25A;

FIG. 25D shows a top down view of the MSM of FIG. 25A with the flexure of FIG. 25C omitted;

FIG. 25E shows a side elevation view of the MSM of FIG. 25A with the flexure of FIG. 25C omitted;

FIG. 26A shows a perspective view of another alternate exemplary MSM;

FIG. 26B shows a top down view of the MSM of FIG. 26A;

FIG. 26C shows a top down view of an exemplary flexure of the MSM of FIG. 26A;

FIG. 26D shows a top down view of the MSM of FIG. 26A with the flexure of FIG. 26C omitted;

FIG. 26E shows a side elevation view of the MSM of FIG. 26A with the flexure of FIG. 26C omitted;

FIG. 31 shows an alternate exemplary flexure;

FIG. 32 shows another alternate exemplary flexure;

DETAILED DESCRIPTION

The inventor has conceived of novel technology that, for the purpose of illustration, is disclosed herein as applied in the context of powder bed and other types of laser additive manufacturing (LAM) in metals also known as selective laser melting (SLM), direct deposition, wire feed, and other similar procedures. While the disclosed applications of the inventor's technology satisfy a long-felt but unmet need in the art of LAM in metals, it should be understood that the inventor's technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 2:
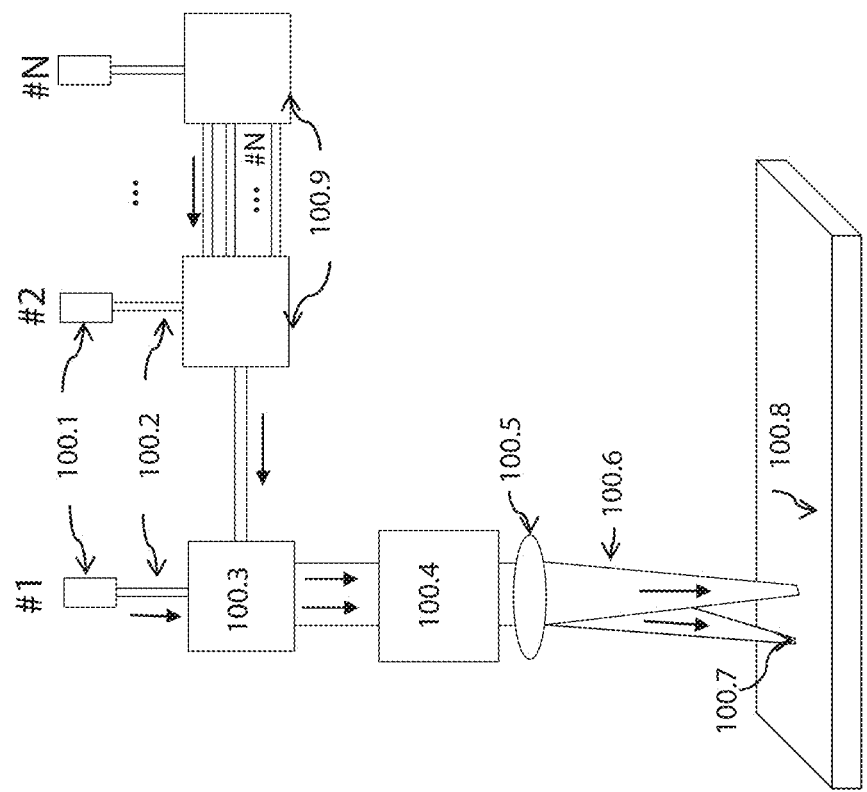
FIG. 2 is a schematic illustration of a laser additive manufacturing system that utilizes two or more (N=2, 3, . . . ,) beam combining optical systems to focus two or more (N=2, 3, . . . ,) projected beams at a powder bed or other work piece material surface.
Figure 1:
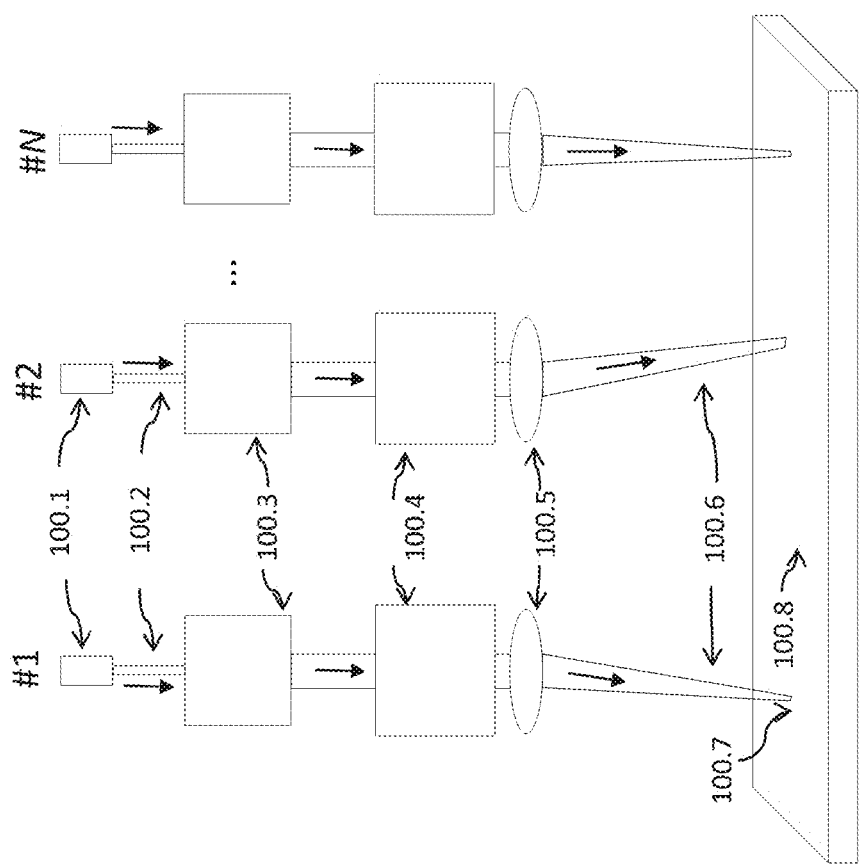
FIG. 1 is a schematic illustration of a laser additive manufacturing system that uses two or more (N=2, 3, . . . ,) projected beams with independent laser sources, beam forming, scanning and focusing optics to form focal spots at different regions of a powder bed or other work piece material surface for simultaneous fabrication of several parts.

Currently, several dual-beam and four-beam laser systems adapted for laser material processing and LAM have been demonstrated. The existing multi-beam LAM systems utilize separate optical trains for each beam composed of laser sources (100.1) that generates laser beams (100.2), beam forming (100.3), scanning (100.4), and focusing (100.5) optics. FIG. 1 illustrates a LAM system for independent processing of the stock material using N projected beams (100.6) that form focal spots (100.7) at the powder bed surface (100.8) or other point of manufacture work pieces. Additional beam combining optics (100.9) are required to LAM processing with co-located or closely located focal spots as illustrated in FIG. 2 for the case of N-beam LAM. Scaling of the existing multi-beam LAM systems as shown in FIG. 1 and FIG. 2 to include large numbers of individually controlled laser beams would require the integration of multiple optical trains similar to those shown in FIG. 1 and FIG. 2, resulting in an extremely bulky, heavy and expensive LAM system. In addition, the demonstrated multi-beam LAM systems do not include sensors for feedback control and thus cannot provide on-the-fly modification of laser beam characteristics based on work piece sensing data. The systems and methods disclosed herein offer solution to these problems.

Another major drawback of the existing LAM systems is that they are largely based on the so-called single-point-processing technique. In the systems illustrated in FIG. 1 and FIG. 2, sharply focused projected laser beams (100.6) create highly localized (point) heat sources that are rapidly rastered (scanned) with beam scanning optics (e.g., galvo mirrors) for selective laser melting (SLM) of a stock material.

This single-point-processing LAM technique suffers from various drawbacks, such as a highly localized (point) heat source that is generated by a sharply focused laser beam at a powder bed or other manufacturing work piece resulting in large thermal gradients in the processing material, the laser beam spot diameter, ranging from about fifty to hundreds of microns, only marginally exceeds the characteristic powder particle size (~10-45 μm for Ti-6Al-4V alloy), resulting in a tiny processing volume, and processing with a single laser beam requires high-speed focal spot rastering (scanning) to avoid unacceptably long manufacturing times. These drawbacks and others of current single-point LAM technology can be alleviated with systems and methods disclosed herein.

I. Exemplary AMBFA-LAM System Configuration

Figure 3:
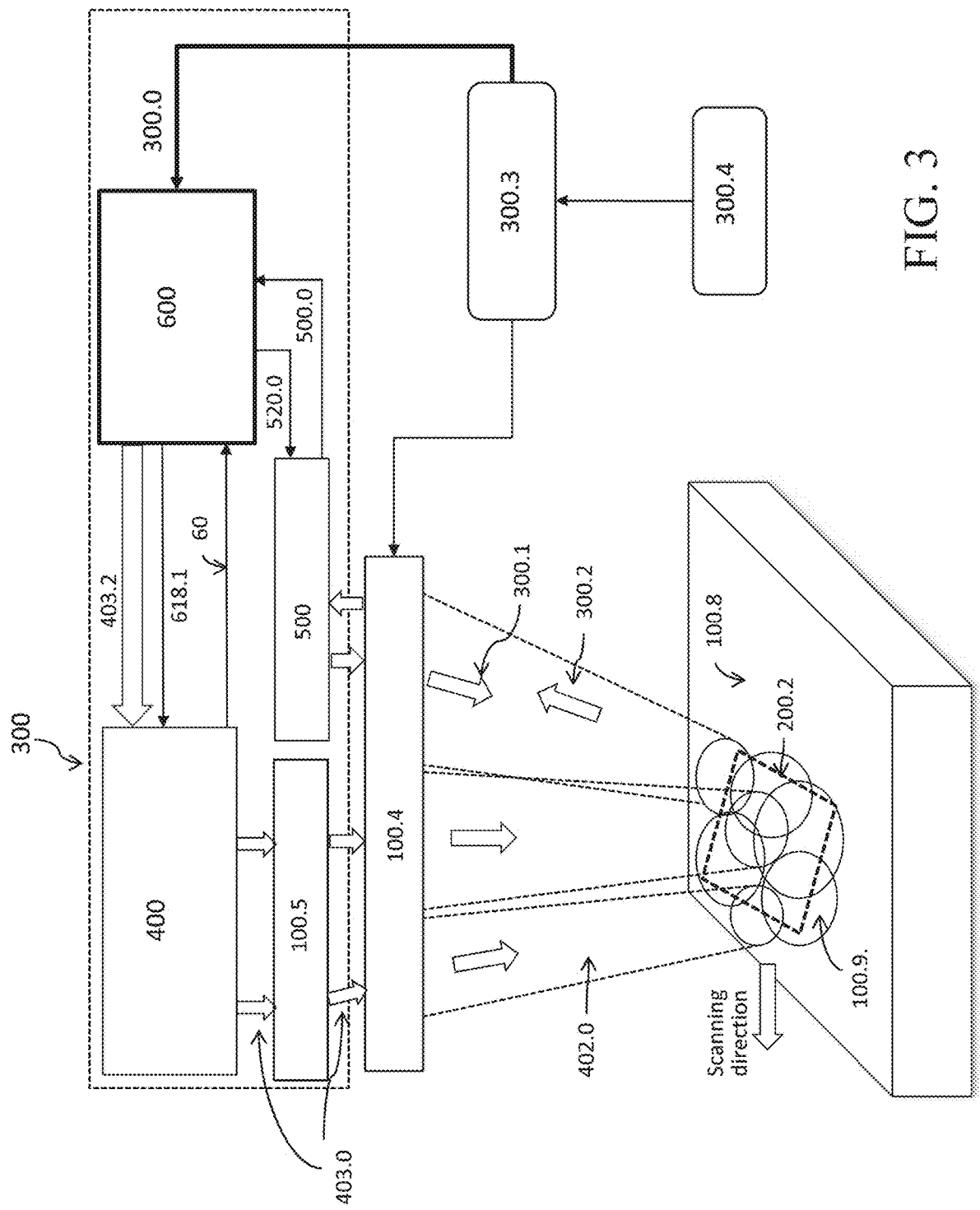
FIG. 3 is a notional schematic of an adaptive multi-beam fiber-array laser additive manufacturing system (AMBFA-LAM)
Figure 4:
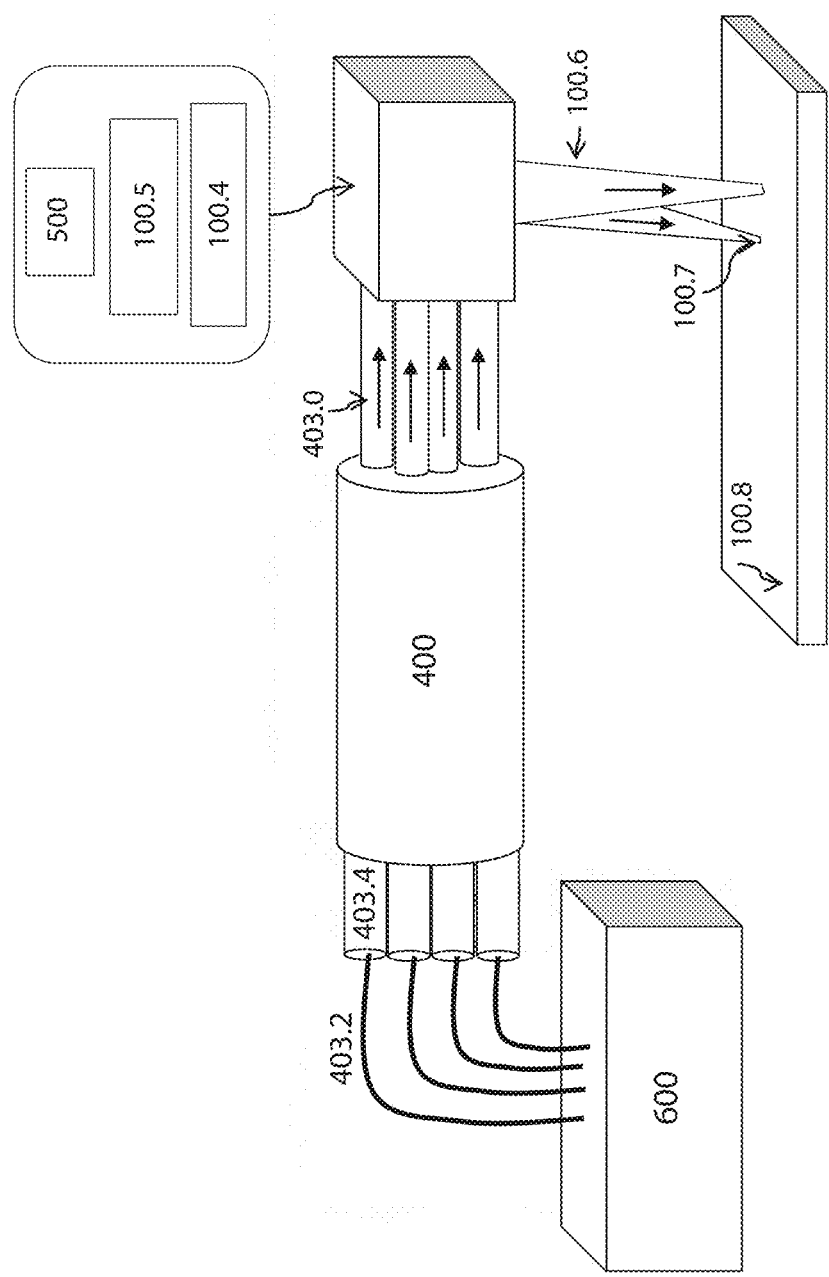
FIG. 4 is another notional schematic of an adaptive multi-beam fiber-array laser additive manufacturing system (AMBFA-LAM)

The adaptive multi-beam fiber-array laser additive manufacturing system disclosed herein, which may be referred to as AMBFA-LAM, is illustrated in FIG. 3, and a variation in FIG. 4. The AMBFA-LAM system (300), which may also be referred to as a laser transmitter module, may be self-contained within a single case, chassis, or module, or may be spread across one or more cases, modules, or devices. The AMBFA-LAM system (300) is comprised of the multi-beam fiber array laser head (400), which may also be referred to as a laser transmitter or multi-beam transmitter, that may have integrated beam pointing and/or focusing modules, beam forming optics (100.5), one or more powder bed sensing modules (500), the multi-channel optical power amplifier (MOPA) fiber system with controllers (600), beam rastering controller (300.3), and a target object definition data (300.4), which may be generated by an additive manufacturing CAD software or another source, that provides parameters for an object to be fabricated, which may also be referred to as a target object. The AMBFA-LAM system generates multiple near-diffraction-limited quality laser beams for simultaneous pre-heating, full melting and post-heating of the feedstock material on the powder bed surface (100.8). In some implementations, the AMBFA-LAM system (300) may include integrated and/or attached passive (image-based) and active (probe lasers based) powder bed sensing modules (500) which may detect backscattered probe beam light (300.2).

While FIG. 3 shows a LAM system using a powder bed type point of manufacture, it should be understood that embodiments of the technology disclosed herein may be utilized with points of manufacture other than a powder bed, and that some embodiments of this technology may rely upon a wire feed point of manufacture, or direct deposition point of manufacture. A wire feed point of manufacturer uses a wire, coil, bar, or other form of solid material that is placed at the point of manufacture and then targeted by laser beams. As the material melts, new lengths of the wire or coil may be fed into the melt zone, and the materials and lasers may be moved and adjusted as necessary to create the desired object. A direct energy deposition point of manufacture uses a nozzle or other spraying mechanism to spray powdered material into the melt zone as needed. The deposition nozzle is often mounted proximately to the laser head, and the entire assembly may be positioned and oriented as needed to create the desired object. Each of these types of manufacture, powder bed, wire feed, and direct energy deposition, have advantages and disadvantages, and each may be used in embodiments of the technology disclosed herein as may be desirable based upon such factors as desired cost, complexity, durability, environment and type of use.

While the technology described herein may use different point of manufacture types in different embodiments, for clarity, the figures and descriptions will primarily depict and describe powder bed type systems. In a powder bed application, the processing beams transmitted by the AMBFA-LAM fiber array laser head and sensing probe beams move across the powder bed surface using a beam rastering (scanning) system (100.4) based on galvo and or different type scanning mirrors, and/or high-precision x-y-positioning gantry platform. The target object definition data is comprised of the coordinates for the multi-beam position at the material surface, and a set of multiple beam parameters that define spatiotemporal distribution of laser power at the material, which may also be referred to as a beam shaping method. In a time sequence of multi-beam rastering across the powder bed surface, a target object definition data is sent to the beam rastering controller (300.3). The beam rastering controller (300.3) supplies the multi-beam position coordinates to beam rastering system (100.4) that provides positioning of the configuration of beams at the powder bed surface based on the target object definition (300.4). A subset of the target object definition data (300.0) that includes the set of multiple beam parameters defining the beam shaping method, are sent by the beam rastering controller (300.3) to the beam shaping controller (618) of the MOPA system (600) described below. The processing, receiving, and transmitting of the target object definition may be performed by one or more processors or devices, and may be performed by processors arranged and configured in various, ways. Alternative implementations will be apparent to one of ordinary skill in the art in light of the disclosure herein. For example, in one implementation, the beam rastering controller (300.3) and the beam shaping controller (618) could be the same processor, controller, or device, so that part or all of the target object definition may be provided to different methods or functions being executed on that single controller, which could then provide control signals to other devices.

Fiber Array Laser Head and Sensing Modules. In this section, we discuss the basic hardware that is used in the disclosed AMBFA-LAM systems and methods for AM in metals with a fiber array laser sources and adaptive multi-beam shaping. The disclosed selection of elements, modules and subsystems comprising the AMBFA-LAM, as well as their combination and functionalities are arranged and configured in novel ways to specifically address the needs for the adaptive beam shaping in LAM applications. As a result, the AMBFA-LAM device (300) includes a variety of innovative elements, modules, sub-systems and functionalities that are useful for metallic LAM applications.

Figure 5:
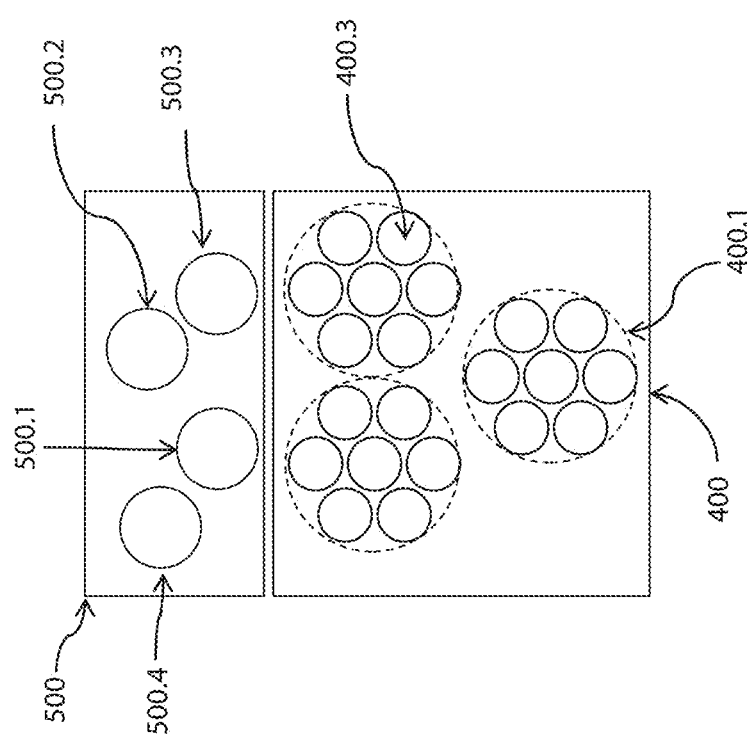
FIG. 5 is a notional schematic of multi-beam transmitter section view of an exemplary fiber array transmitter with attached optical receiver and sensing module.

The AMBFA-LAM device (300) in FIGS. 3 and 4 can be assembled having different configurations for the fiber array laser transmitter (400), also referred to as fiber array laser head, and for multi-channel optical power amplifier (MOPA) system with controllers (600). The AMBFA-LAM device (300) may also include integrated powder bed or material sensing modules (500), beam forming optics (100.5), and beam rastering (scanning) system (100.4). FIG. 5 shows a front perspective view of an exemplary fiber array transmitter device (400) with attached sensing modules (500). The fiber-array laser head (400) is used to transmit a single or multiple laser beams (403.0) that are focused into a processing region (200.2) at the powder bed surface (100.8) using the beam forming optics (100.5). The focal spots of the transmitted beams may be rastered over the powder bed surface using a beam rastering (scanning) system (100.4). As discussed above, embodiments of this technology may use wire feed or direct deposition systems instead of powder bed, in which case a beam rastering system (100.4) may be replaced or modified to move and orient a beam and wire or a beam and material deposition nozzle.

Figure 6:
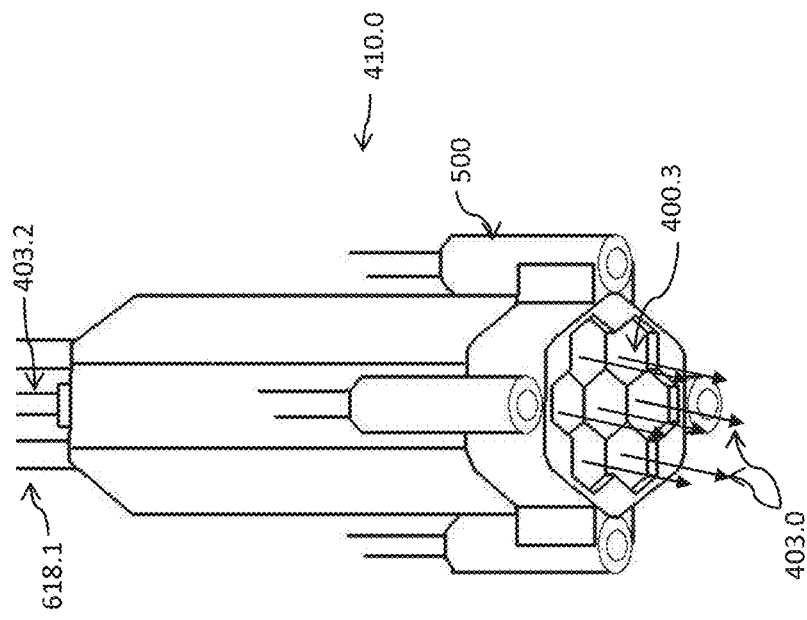
FIG. 6 is a front perspective view of an exemplary fiber array laser head system composed of seven fiber-based laser transmitters and attached four sensing modules.

The material sensing modules (500) are used for characterization of: (a) powder particles prior to LAM processing, (b) molten pool during LAM processing, and (c) consolidated into metal track immediately after processing. These material sensing modules may also provide feedforward and/or feedback control of characteristics for the projected onto powder bed surface laser beams, which can be used to improve LAM productivity and quality. The material sensing modules (500) can be integrated into the fiber array laser head or be attached to it, as illustrated in FIG. 5 and FIG. 6, or be a part of beam forming (100.5) or beam rastering (100.4) systems, or be used independently on these devices. The material sensing modules (500) may comprise one or several imaging sensors (500.4), one or more probe laser illuminators (500.1), and other components. The material sensing modules (500) may also utilize identical or different wavelengths, include one or more optical receivers (500.2), and one or more probe laser transceivers (500.3).

The fiber array laser head device (400) in FIG. 5 is shown as composed of a set of densely-packed fiber-based laser transmitters (400.3) that transmit laser beams (beamlets) used for multi-beam selective laser melting (SLM) in metallic LAM. The array of beamlets is also referred to as a combined beam. The fiber-based laser transmitters (400.3) can be integrated into one or more fiber array clusters (400.1) that are constructed by using the one or more fiber-based laser transmitters, as shown in FIG. 5. While the embodiment of FIG. 5 shows a fiber array transmitter having three fiber array clusters (400.1) composed on seven densely-packed fiber-based laser transmitters (400.3), also referred to as subapertures, with the precise number of subapertures and the number of fiber array clusters being varied based upon such factors as price, desired size and capabilities of the device (400) and other factors. FIG. 6 additionally shows 3D view (410.0) of an exemplary fiber array laser head system (400) composed of a single fiber array cluster with seven densely-packed fiber-based laser transmitters. The fiber array cluster (410.0) in FIG. 6 has four sensing modules (500) attached to it.

Figure 7:
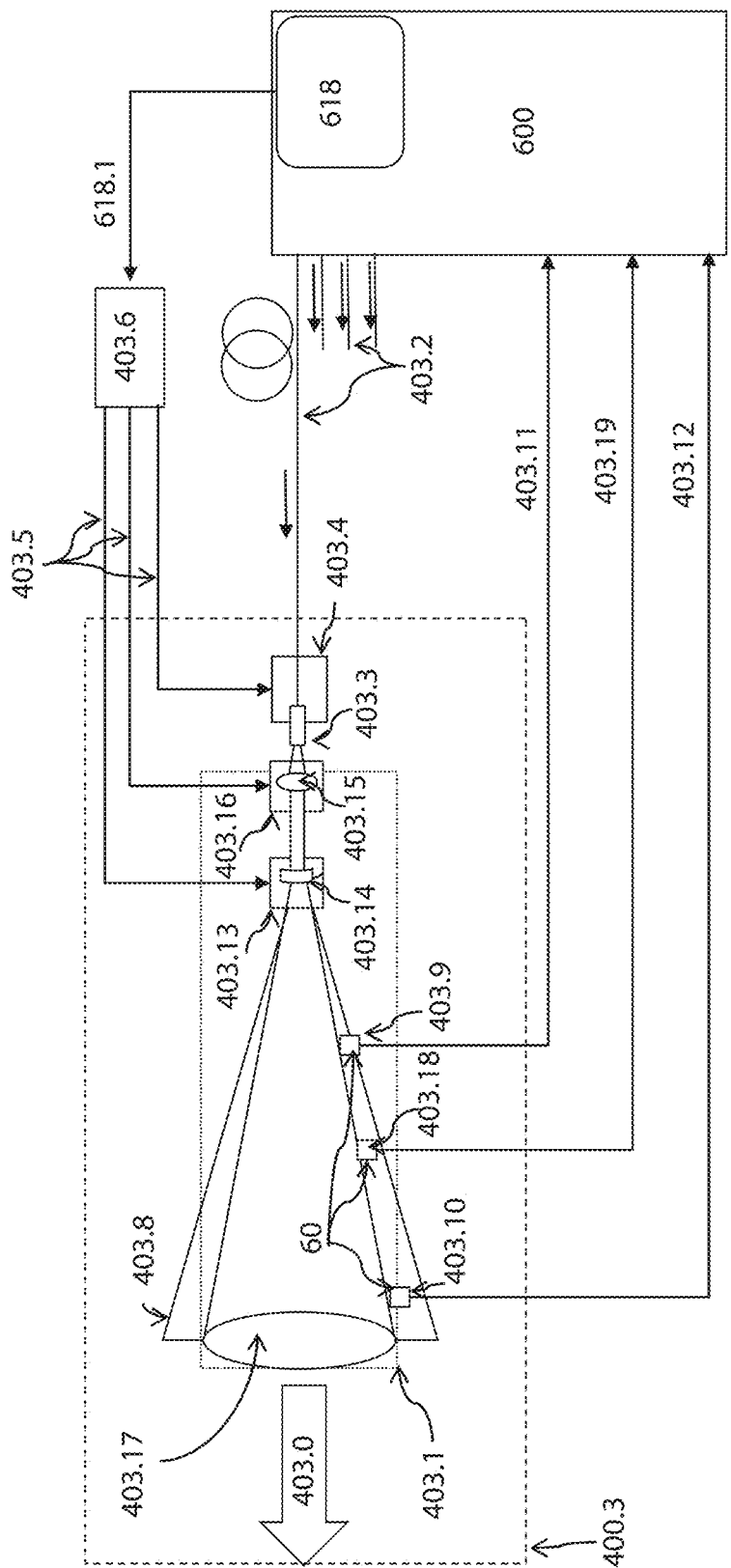
FIG. 7 is a notional schematic of an exemplary fiber-based laser transmitter module.

The embodiment of FIG. 7 shows an exemplary fiber-based laser transmitter (FBLT) module (400.3). The integrated densely packed array of the FBLT modules form the fiber-array laser head (400) for transmission of multiple beams (403.0). The FBLT module has integrated capabilities for the transmitted beam (403.0) electronic pointing and steering at the powder bed or other material surface. Additional capabilities may include the transmitted beam divergence control that allows electronic control of width for the laser beam focal spot (100.9) at the powder bed or material. The disclosed methods and algorithms for controllable shaping of laser power spatial distribution at the powder material for LAM, as described below, make use the FBLT module capabilities for the transmitted beam pointing, steering and focal spot width control.

The FBLT module may include one or more integrated sensors (403.9), (403.10), and (403.18), also referred to here as beam sensors (60), for real-time measurements of the transmitted beam polarization, piston phase and power. The output signals of polarization (403.11) and piston phase (403.12) sensors can be utilized for stabilization (locking) of polarization states (polarization locking) and piston phases (phase locking) of the transmitted by the fiber array laser head (400) multiple beams using the corresponding controllers of the MOPA system (600) as described below. The output signals (403.11), (403.12) and (403.19) are provided to the MOPA (600). Polarization and phase locking capabilities are part of the disclosed techniques for spatiotemporal control of multi-beam intensity distribution for LAM. As shown in FIG. 3, the MOPA system (600) may also be configured to provide signals (618.1) from beam shaping controllers (618), and to receive signals from beam sensors (60), which may comprise one or more of phase (403.10), polarization (403.9), and power (403.18) sensors.

The FBLT module in FIG. 7 uses a beam forming optical system (403.1) composed of a single lens or several lenses and/or mirrors. This optical system transforms the laser beam that is emitted from the tip of the delivery fiber (403.3) into an output beamlet (403.0). An exemplary beam forming system (400.3) in FIG. 7 is composed of three lenses: small size collimating (403.15) and negative (403.14) lenses, and output beam forming lens (403.17). The optical energy entering the FBLT module in the form of a single mode Gaussian-shape laser beam is delivered by the MOPA fiber system (600). To provide the capability of angular pointing and steering for the transmitted laser beam, the end piece of the delivery optical fiber (403.2) with fiber tip (403.3) may be assembled inside a fiber-tip positioning module (403.4) that can provide electronically controlled x- and y-displacements of the fiber tip in directions orthogonal to the laser beam propagation axis. The fiber tip displacement results in angular deviation of the transmitted laser beam, and corresponding displacement of the focal spot footprint (100.9) at the powder bed or other material surface. The control of the fiber-tip x- and y-displacements is performed using electrical signals (403.5) that are generated by the controller (403.6) in response to input signals (618.1) from the beam shaping controller (618) of the MOPA system (600).

Angular steering for the transmitted laser beam can be also implemented using the disclosed lens-x/y positioning module (403.13) capable for controllable x- and y-high precision displacement of a small size negative lens (403.14)—a part of the beam forming optical system (403.1)—in directions orthogonal to laser beam propagation axis. The lens x- and y-displacements results in the outgoing beam wavefront tip and tilts leading to angular deviation of the transmitted laser beam propagation direction. The lens x-y position control is performed by applying electrical control signals (403.5) that are generated in the controller (403.6) using the input control signals (618.1) from the beam shaping controller (618) of the MOPA system (600). A portion of the beam within the beam tail area (403.8) is clipped by aperture of the beam-forming optics and used for sensing of beam characteristics with the beam sensors (60).

The FBLT module (400.3) in FIG. 7 may include additional capabilities for transmitted beam divergence control, which in turn alters the size of the focal spots projected onto the powder bed or material surface. The beam divergence control can be implemented using the disclosed lens z-positioning module (403.16) capable for controllable displacement of a small size lens (403.15) along laser beam propagation direction (along optical z-axis).

II. Multi-Channel Optical Power Amplifier (MOPA) Fiber System

Basic fiber-optics hardware with controllers, referred to herein as the multi-channel optical power amplifier (MOPA) fiber system, that is a part of the AMBFA-LAM device (300) is illustrated in FIGS. 3 and 4. The MOPA system (600) is used for laser power delivery to the fiber array laser head (400) and adaptive beam shaping in the described applications of metallic LAM.

Figure 8:
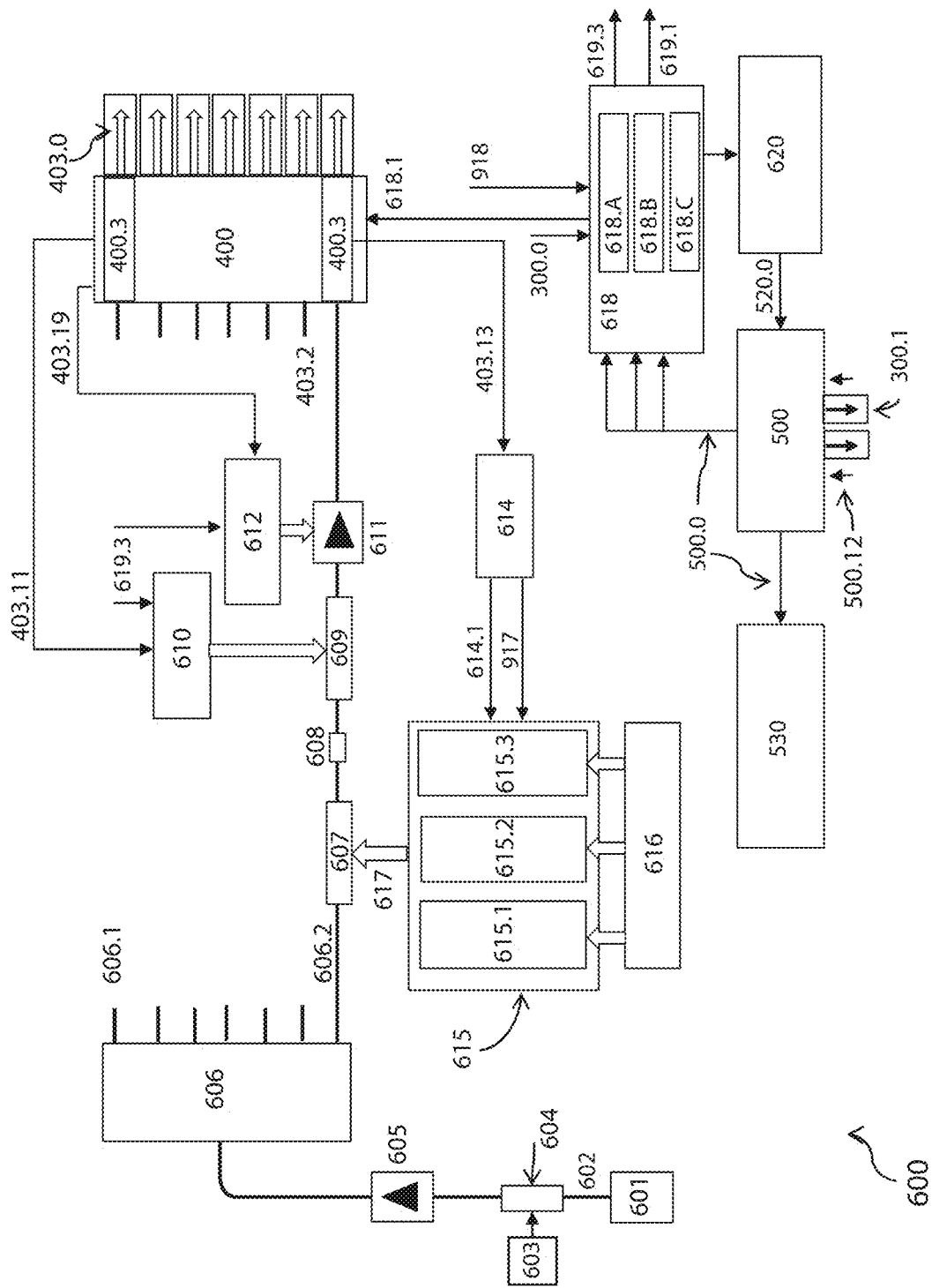
FIG. 8 is a schematic block-diagram of an exemplary multi-channel optical power amplifier (MOPA) fiber system with controllers.

The schematic of an exemplary MOPA fiber system (600) is shown in FIG. 8. The MOPA system (600) in FIG. 8 is shown as composed of the following basic modules:

A single mode narrow linewidth seed laser (601) with an optical module that provides laser beam coupling into a single mode polarization maintaining (PM) fiber (602).

The laser beam of the seed laser which is coupled into a single mode PM fiber, enters fiber splitters (606) that nearly equally divide the input beam between several (from 1 to N) single-mode PM fiber channels (606.1). The number of fiber channels (606.1) corresponds to the number of beams that are transmitted by the fiber array beam laser head (400). Prior to splitting into fiber channels (606.1) the laser beam may be amplified by a fiber pre-amplifier (605) and, in some high-optical power LAM applications, additionally phase modulated to increase linewidth and thus mitigate nonlinear effects in fibers. The laser beam linewidth increase (line broadening) is performed using a special line broadening electronic module (603) that supplies high (GHz-rate) random signal to a fiber-integrated phase modulator (604). Note that in some implementations line broadening may not be needed and if a broad line seed laser (602) is used.

All fiber channels (606.1) of the MOPA fiber system (600) in FIG. 8 are composed of identical fiber-integrated components. For this reason, the embodiment of FIG. 8 shows only these fiber-integrated components for a single fiber channel (606.2). After splitting into N channels in the fiber splitters (606), each laser beam passes through a controllable phase shifter (607) that may be, for example, lithium niobate (LiNbO$_3$) based. The phase shifters of the MOPA system introduce controllable variations (modulations) of optical path differences (OPDs) in the fiber channels (606.1). The controllable modulations of the OPDs are introduced by the piston phase controller (615) and result in the corresponding changes of the aperture-average (piston) phases of the transmitted beamlets (403.0). Control voltages (617) applied to the phase shifters (607) are generated in a piston phase controller (615) using one or another beam shaping methods as described in further details below.

Related to the adaptive beam shaping method disclosed herein, this piston phase controller may operate in the following regimes described below: phase randomization (615.1), stair-mode beam steering (615.2), phase locking (615.3), and time-multiplexing control (616). The time-multiplexing control unit (616) is used to select and/or multiplex in time the operational regimes of the piston phase controller (615).

After passing phase shifters (607), the laser beams with modulated OPDs are amplified using the power fiber amplifiers (611) and through delivery fibers (403.2) enter the array of fiber-based laser transmitters (FBLT) of the fiber array laser head assembly (400). The FBLT modules (400.3) are described above and illustrated in FIG. 7.

In the beam shaping applications for LAM that require additional control of the transmitted beams polarization states, the PM fibers are spliced with non-PM delivery fibers as shown in FIG. 8 by the fiber splice point (608). Correspondingly, in this case, the power fiber amplifiers (611) may be also based on non-PM single mode fibers. In these applications, control of the transmitted beams polarization states is performed using the polarization controllers (610), which is configured to receive signals (619.3) from the beam shaping controller (618). The control signals are applied to the polarization adjusters (609). The polarization controller (610) receives signals (403.11) from the polarization sensors (403.9). These sensors could be either external in respect to the fiber array laser system (400) or integrated into the fiber array system (400) as shown by (403.9) in FIG. 7.

Note that polarization control that results in identical polarization states for all transmitted by fiber array beams, also known as polarization locking, is commonly required in high-power (kW-class) fiber array systems that intentionally use non-PM fiber and fiber elements in the MOPA system in order to reduce non-linear effects in fibers. In the MOPA fiber systems based on PM single mode or low-mode-number (LMN) PM fibers polarization locking may not be required. In the LAM applications that may not require piston phase and polarization control for beam shaping, the MOPA system (600) may be based on, or include into it non-PM fibers and fiber components and subsystems. In this MOPA system configuration, referred to as incoherent MOPA, the phase shifters (607) and polarization adjusters (609), as well as the corresponding piston phase and polarization controllers and sensors are not required. The AMBFAL-LAM system (300) with the incoherent MOPA has reduced adaptive beam shaping capabilities that may include the transmitted beamlets (403.0) electronic pointing, steering and focal spot control at the powder bed or other material surface.

III. AMBFA-LAM Beam Forming and Rastering Systems

Figure 9:
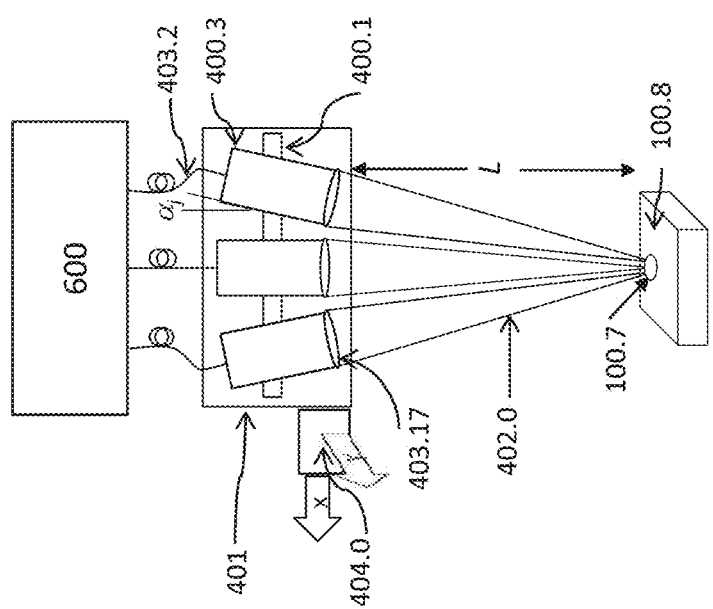
FIG. 9 is a notional schematic of an exemplary AMBFA-LAM system having a virtual lens-based fiber array laser head.

Implementing the described below configuration of the fiber array laser head device (400), referred to here as virtual lens-based fiber array laser head, and selected laser melting (SLM) method referred to as remote SLM, the AMBFAL-LAM system (300) in FIG. 3 may be used without external beam forming optics (100.5), for example, without a conventional F-theta beam focusing lens, and/or without conventional beam rastering (104) system, for example based on galvo scatters. This virtual lens-based fiber array laser head (401) is illustrated in FIG. 9. In this illustration, the fiber array laser head (401) of the AMBFA-LAM system generates an array of focused beams whose focal spots are located at the powder bed or material surface positioned a pre-defined distance L from the laser head.

In the virtual lens-based fiber array laser head assembly (401), each fiber-based laser transmitter (FBLT) module (400.3) shown in FIG. 7 contains a beam forming optical system (403.1) that is designed to focus beamlets at a distance L from the laser head. To overlap or position the beam's focal spots in the processing region at the powder bed or material surface, the fiber based laser transmitter modules (400.3) are assembled inside a specially designed mounting holder (400.1) at pre-calculated angles $\{\alpha_j\}$ (j=1, . . . , N) that are dependent on a selected distance L to the work piece, as illustrated in FIG. 9. The virtual lens-based fiber array laser head assembly (401) centers the beams' focal spots inside a designated aim-point area of the work piece—similar to what can be achieved with a large-aperture beam forming optics (100.5) for example conventional or F-theta lens in front of the fiber array laser head (400) composed of fiber based transmitter modules (400.3) producing collimated output beams (403.0), as shown in FIG. 3 and FIG. 6.

The distance L between the virtual lens-based fiber-array laser head (401) and the powder bed surface (100.8) can be specified based on technology-driven needs, and could significantly exceed the 20-50 cm upper limit of the currently used metallic 3D printing systems that utilize conventional mirrors-based scanners, for examples scanners with galvo-mirrors. The possibility for significant (three-to-five folds) increase to the distance L between the laser head and the stock material, which is achievable with the disclosed virtual lens-based fiber-array laser head device (401), without causing an unacceptable enlargement in the combined laser beam focal spot size, and without need for additional large aperture heavy and expensive beam forming optics, is highly desirable. Such extended-range (remote) LAM prevents contamination of the laser head and sensor optics by the heat and debris that are generated in the heat affected zone (HAZ) at the powder bed or material surface. Note that to keep the focal spot size unchanged with increasing the beam focusing distance L, one may proportionally increase optical aperture size of the fiber array laser head and provide locking of beamlet piston phases.

Figure 10:
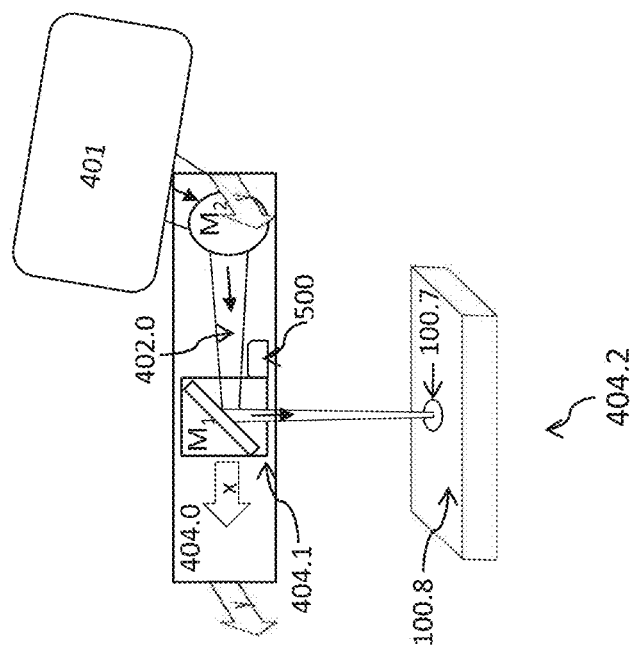
FIG. 10 is a notional schematic of an exemplary assembly of multi-beam rastering system that utilizes a virtual lens-based laser head attached to a gantry system having beam pointing mirrors and material sensing modules for multi-beam focal spot pointing at a powder bed surface or manufacture point.
Figure 11:
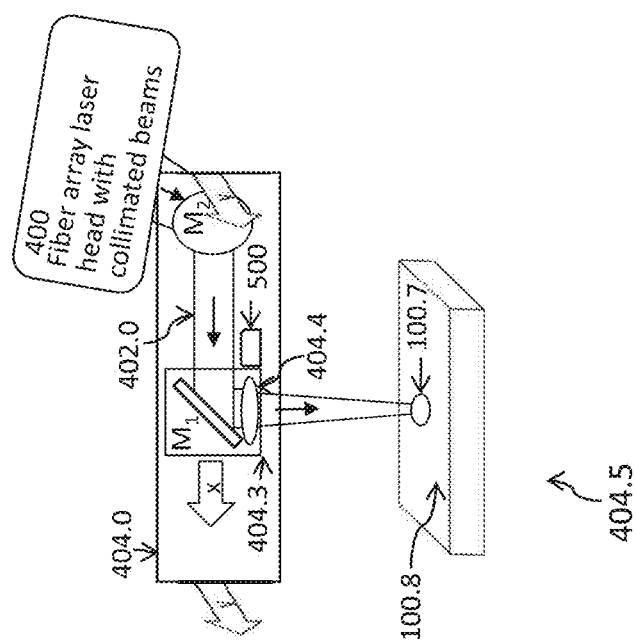
FIG. 11 is a notional schematic of an exemplary beam rastering system using a fiber array laser head with collimated beams and a gantry system with attached beam pointing mirrors and focusing lens for multi-beam focal spot pointing at a powder bed surface or manufacture point.

Having a longer distance L from the work piece additionally allows replacement of conventional mirrors-based beam rastering systems with a high-precision, high-speed x-y-gantry system (404.0) as illustrated in FIG. 9 and FIG. 10. FIG. 10 shows a beam rastering system using virtual lens-based fiber array laser head and x-y-gantry system (404.2). For the combined beam rastering at the powder bed or material surface, the virtual lens-based fiber array laser head (401) could be either directly attached to the gantry platform (404.0) and move together with it as shown in FIG. 9, or be used to illuminate a simple assembly of beam pointing mirrors attached to the x-y-gantry system as illustrated in FIG. 10, where the attached to the gantry system mirrors $M_1$ and $M_2$ provide focal spot pointing to the powder bed surface (100.8). The mirror $M_1$ is attached to the movable platform (404.1) that moves in x-direction, while both $M_1$ and $M_2$ mirrors can be independently moved in orthogonal y-direction, thus providing beam rastering. Note that since the distance L between the laser head (401) and the powder bed (100.8) varies during beam rastering, the characteristic focal spot size d is also changing. For long distance L and relatively small LAM working envelop, this undesired effect of focal spot size change is small. Otherwise, for large area LAM processing, the effect of focal spot size change can be mitigated using the corresponding controllable change of the focal distance of the fiber-based transmitters (400.3) with lens z-positioning modules (403.16) in FIG. 7. Another possible option is illustrated in FIG. 11, which shows a beam rastering system using fiber array laser head with collimated beams and x-y-gantry system (404.5). In this multi-beam rastering method the fiber array laser head (400) generates collimated beams that are focused onto the powder bed or material surface using the focusing lens (404.4). This lens is attached to the moving x-direction platform (404.3) immediately after the pointing mirror $M_1$ and moves together with this mirror.

Figure 12:
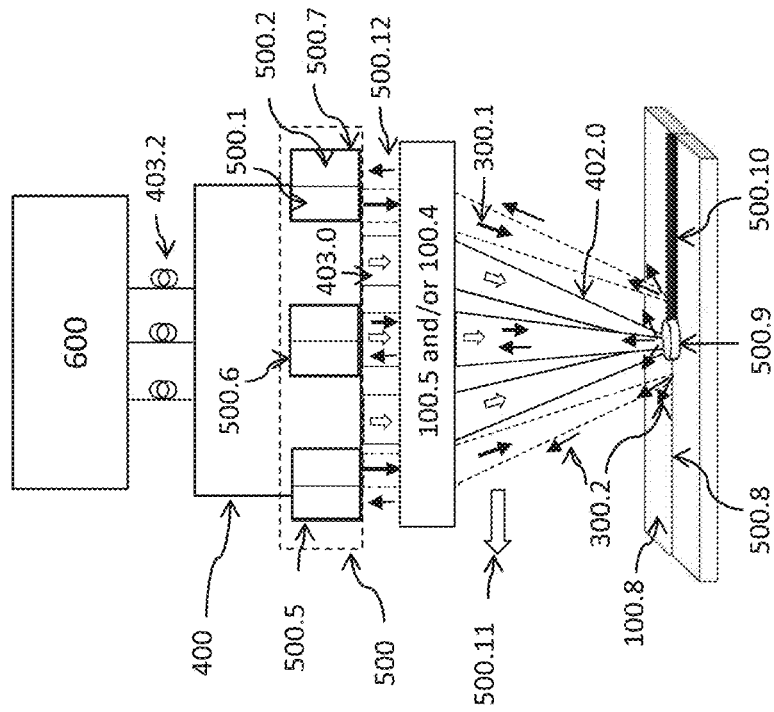
FIG. 12 is a notional schematic of an exemplary AMBFA-LAM system assembly with material sensing modules.

Sensing methods usable with implementations of the disclosed system may include: characterization of powder particles ahead of the LAM processing beam referred to here as powder particles sensing (PPS); sensing of consolidated into metal powder material in the heat-affected zone behind the processing beam, referred to here as the processed-track sensing (PTS); and molten pool characterization, referred to here as molten pool sensing (MPS). The sensing methods disclosed are based on powder bed surface or material surface active interrogation with probe laser beams for in situ characterization of: (a) powder material ahead of the processing beam, (b) inside the processing region and (c) after material consolidation into metallic processed track. Besides the probe laser-based sensing, the AMBFA-LAM material sensing capabilities may be enhanced by passive imaging in visible, near-, middle-, and far-infrared spectral bands. The schematic of FIG. 12 illustrates the material sensing modules including: the powder particles sensing (PPS) module (500.5), molten pool sensing (MPS) module (500.6) and the processed track sensing (PTS) module (500.7).

The AMBFA-LAM material sensors utilize one or more probe beam laser illuminators (500.1), and one or more optical receivers (500.2). The sensors may operate at a wavelength that is identical or different from the processing beam (402.0). Material sensing modules may be directly attached to either the fiber array laser head (400) as illustrated in FIG. 12, or to the virtual lens-based fiber array laser head (401) in FIG. 9 and FIG. 13, or may be attached to a moving platform of the x-y-gantry system (404.1) as illustrated in FIG. 10 and FIG. 11, and thus move with the processing beam (402.0) in a scanning direction (500.11) along the processing track (500.8), creating a molten pool (500.9) and leaving a consolidated into metal track (500.10) behind as the molten pool (500.9) cools, as illustrated in FIG. 12.

Figure 13:
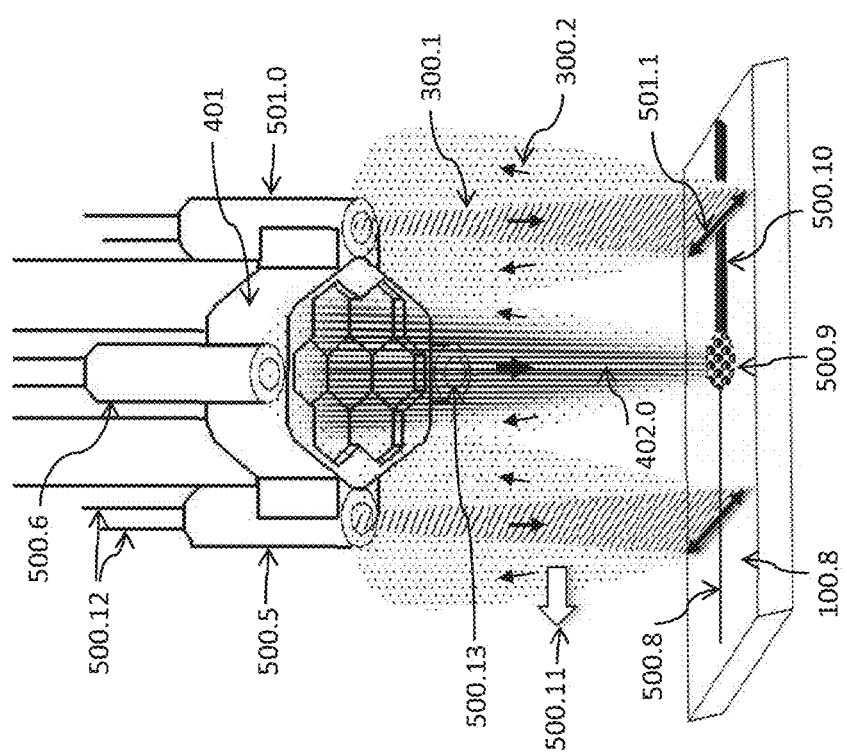
FIG. 13 is a front perspective view of an exemplary virtual lens-based fiber array laser head with material sensing modules.
Figure 14:
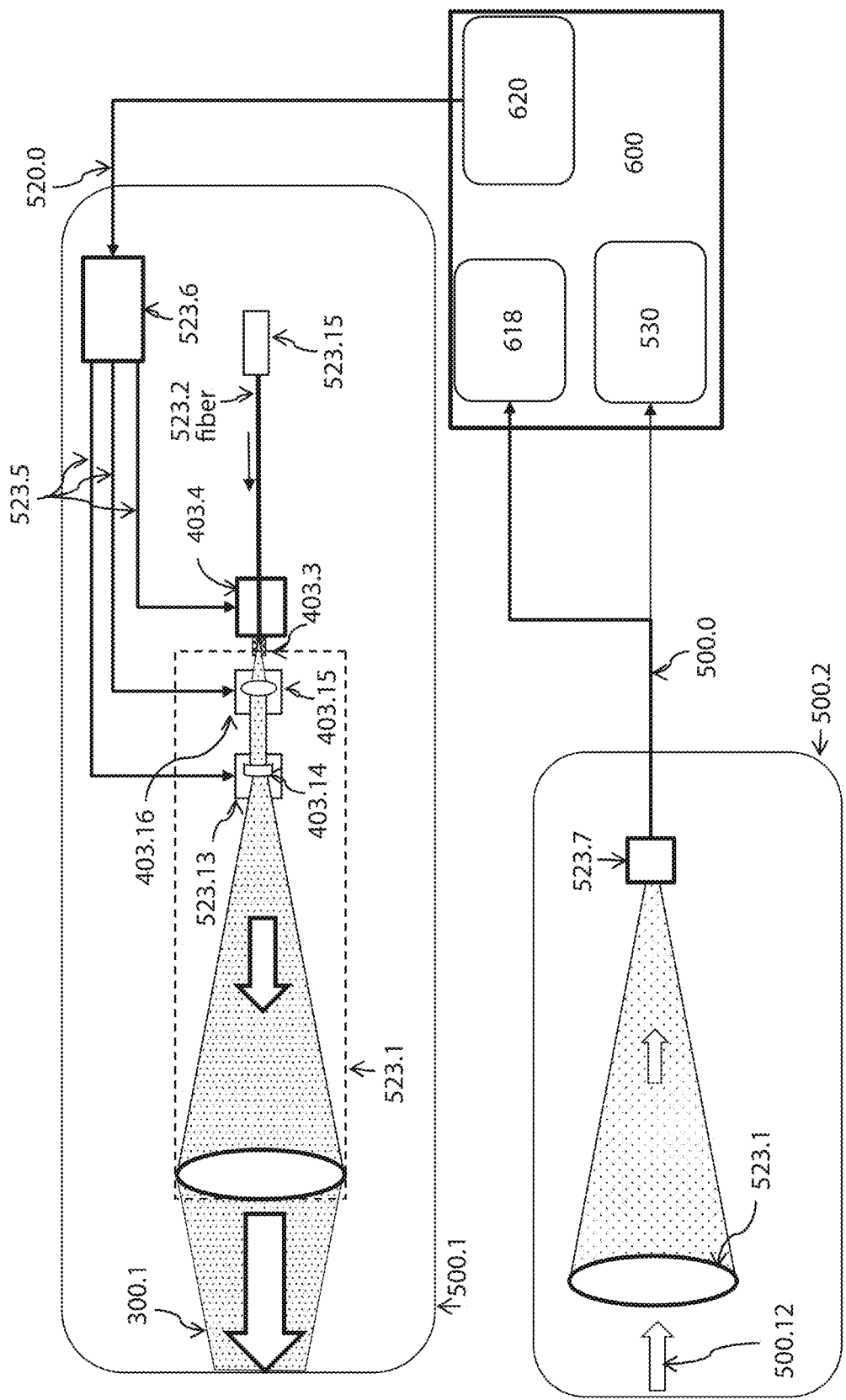
FIG. 14 is a notional schematic of an exemplary material sensing module comprising a probe beam laser illuminator and an optical receiver.

A notional schematic of a material sensing module composed of a probe beam laser illuminator (500.1) and optical receiver (500.2) is illustrated in FIG. 14. The probe beam laser illuminator (PBLI) and optical receiver may be integrated into a single probe beam laser transceiver (PBLT) device (520.3) illustrated in FIG. 15. The PBLT transmits a probe laser beam (300.1) based upon one or more probe beam signals (523.5) from a PBLI controller (523.6), and receives the backscattered light (500.12). The disclosed sensors based on probe beam laser transceivers are discussed below. The schematic of an exemplary virtual lens-based fiber array laser head (401) with attached sensing modules is shown in FIG. 13. The sensing modules include: powder particles sensor (500.5), processed-track sensor (501.0) and molten pool sensor (500.6). Both the powder particle sensor (PPS) and processed-track sensor (PTS) are based on probe beam laser transceivers (520.3) illustrated in FIG. 15, while the molten pool sensor (MPS) includes both the optical (500.2) and the speckle-imaging receiver (500.13) devices illustrated in FIG. 13 and FIG. 14 and described below.

The schematic of FIG. 14 illustrates a material sensing module composed of the probe beam laser illuminator (500.1) and optical receiver (500.2). This material sensor may be used as a powder particles sensor (500.5), a molten pool sensor (500.6), a processed track sensor (500.7), or any combination thereof. Note that these material sensing modules may be also based on the probe beam laser transceiver (520.3) illustrated in FIG. 15 and described below.

The optical schematic and functionalities of the PBLI device (500.1) in FIG. 14 are similar to the fiber-based laser transmitter (400.3) described above and depicted in FIG. 7. The PBLI device uses a single-mode probe beam laser (523.15) that couples laser beam into a single-mode fiber (523.2). The beam coupled into the fiber is delivered to the fiber tip (403.3) that is installed inside a fiber-tip x-y-positioner module (403.4) described above. The PBLI beam forming system (523.1) provides a scaled in size image of the fiber-tip at the material surface, resulting in formation of a probe beam focal spot at the manufacture material. The probe beam focal spot size may be, for example, on the order of magnitude or smaller than the processing beam focal spot. The fiber-tip positioner module (403.4) in the PBLI device (500.1) is used to: (a) center the probe beam focal spot along processing beam track (along processing contour LAM-build part) with a pre-set offset distance in respect to the processing beam focal spot and, (b) rapidly (several kHz speed) scan the probe beam focal spot in a direction orthogonal to the track line direction (501.1) as illustrated in FIG. 13. The offset distance between the focal spots of processing and probe beams, and scanning speed are set by the controller of the powder bed sensors (620) shown in FIG. 14 and FIG. 8. The PBLI device (500.1) may include additional capability for controlling size of the probe beam focal spot using the lens z-positioning module (403.16), similar the described fiber-based laser transmitter (FBLT) module in FIG. 7. The focal spot scanning may also be performed using a lens x/y-positioning module (523.13) also shown in both FIG. 14 and FIG. 7, and described above.

The material sensing module in FIG. 14 includes an optical receiver (500.2) composed of receiver optics (523.1), for example a lens, and photo-detector (523.7). The optical receiver (500.2) that measures power and other characteristics of the backscattered light (500.12) within the receiver optics entrance aperture, is referred to here as the power-in-the-bucket (PM) optical receiver. Another optical receiver type, that could be used in the powder bed sensing modules, is referred to here as speckle-imaging receiver (SIR). In the speckle-imaging type optical receiver, an imaging photo-array is used instead of the photo-detector (523.7). The receiver optics (523.1) of the SIR type device is designed to provide a scaled image of backscattered speckle field at a selected distance $L_{sp}$ between the material surface and the entrance aperture of the receiver optics (523.1). Note, that in the case of the molten pool sensor (MPS) operating at the processing beam wavelength, the probe beam laser illuminator is not required. Optical receivers of such MPS devices, either PIB or SIR or both, use backscattered light of the processing beam, as illustrated in FIG. 13 by the molten-pool PIB (500.6) and speckle-imaging (500.13) receivers. For better signal-to-noise ratio the optical receiver (500.2) may include a bandpass filter (not shown) tuned to optical wavelength of the probe beam laser illuminator.

Figure 15:
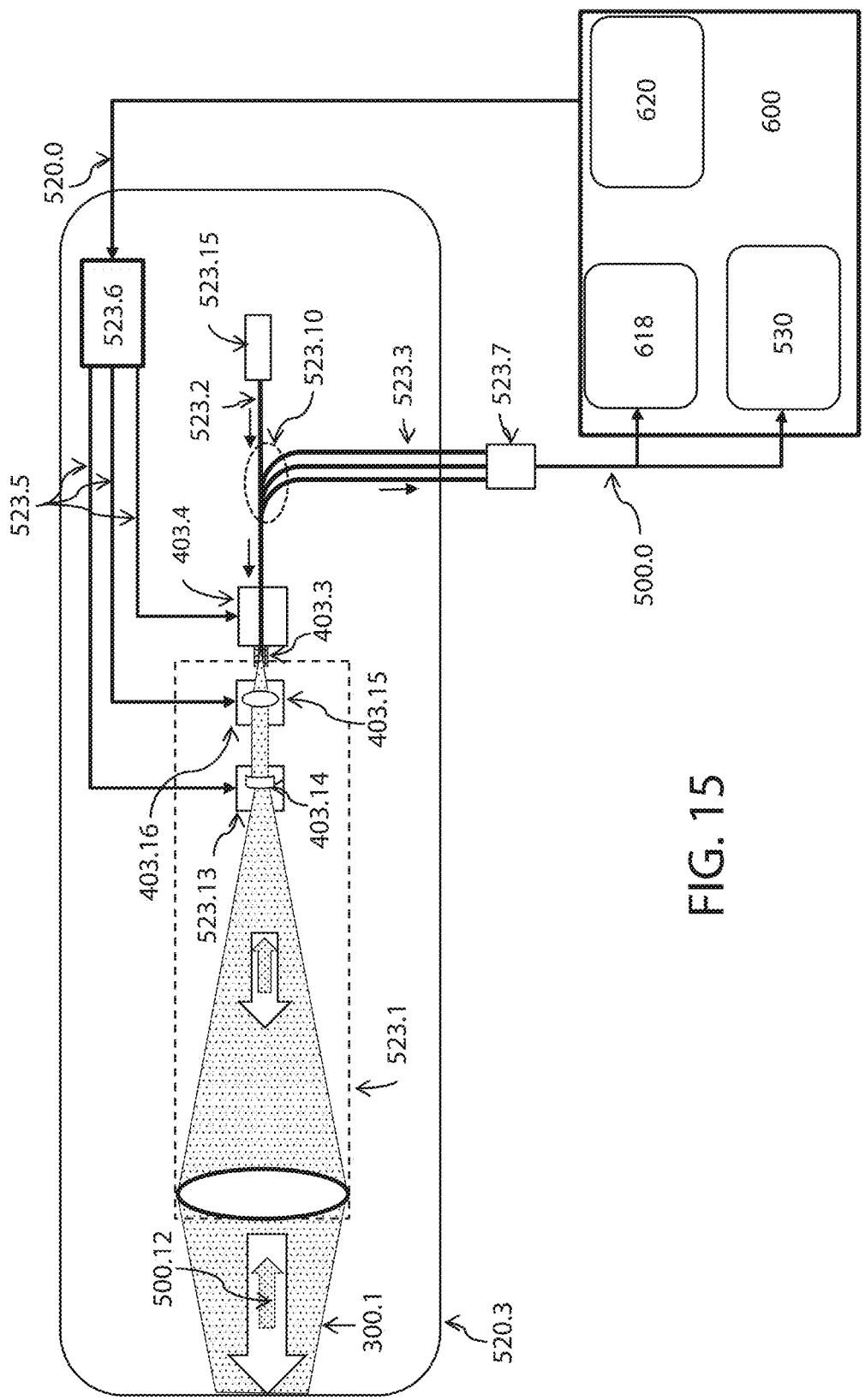
FIG. 15 is a notional schematic of an exemplary probe beam laser transceiver (PBLT) sensor.

The probe beam laser transceiver (PBLT) sensor (520.3) disclosed here and illustrated in FIG. 15, combines functions of the probe beam laser illuminator and the power-in-the-bucket receiver. The PBLT sensor (520.3) is based on a multi-core fiber (MCF) instead of a conventional single-core fiber, as in the probe beam laser illuminator (500.1) in FIG. 14. The MCF has a central fiber core and one or several peripheral fiber cores. The tapered multicore-fiber connector (523.10) guides light from each fiber core of individual fibers, referred to as received fibers (523.3). A probe laser beam is coupled into the center core of the MCF and after passing the PBLT beam forming optical system (523.1) creates a probe beam focal spot on the material surface. The light scattered off the material surface propagates back to the PBLT sensor aperture. A portion of the backscattered light is coupled into the MCF peripheral cores and delivered to the photo-detector(s) (5.23.7) through the tapered multicore-fiber connector (523.10) and the received fibers (523.3). The photo-currents registered by the photo-detectors are combined, and the corresponding signal (500.0) is delivered to the beam shaping controller (618) and/or the sensing data collection and analysis module (530) of the MOPA system (600). The MOPA system (600) may also provide one or more control signals (520.0) to the powder bed sensing modules (500).

IV. LAM Process Characterization and Control Based on Material Sensing

In the material sensing methods disclosed, the focal spots of the probe and processing beams travel together with a constant offset distance between them. This allows real-time characterization of powder particles, molten pool and the processed track throughout the entire manufacturing process. Analysis of the received signal from the PBLT sensor (520.3) that is used as the powder particles sensor (PPS) provides in situ information about stock material properties (e.g. powder particle absorbability, size distribution, and packing density) directly ahead of the processing beam. Similarly, analysis of the signal registered by the PBLT sensor (520.3) that is used as processed-track sensor (PTS) can be utilized to characterize the post-processed region. Similarly, analysis of the signal registered by the PBLT sensor (520.3) that is used as molten pool sensor (MPS) can be utilized to characterize the molten poll region. Note that the MPS device may operate with wavelength different from the processing beam. The output signals of the PBLT sensors can be utilized for feedforward control of the main beam.

In the material sensing method disclosed here, the PBLT sensor (520.3) may operate as a confocal microscope and provide live streaming imagery of a small region on the material surface along the processing track, ahead, inside and behind the processing beam. In the confocal imaging operational regime, the probe beam focal spot is continuously scanning in a direction orthogonal to the processing part counter direction, as illustrated in FIG. 13. With a scanning speed significantly exceeding the processing beam velocity, the PBLT can record a continuous stream of line-scan images of the material surface ahead, inside, behind, or any combination thereof, in relation to the processing beam.

LAM process characterization and adaptive beam shaping using the disclosed method may be based on analysis of statistical characteristics of the backscattered probe light. Statistical characteristics of the probe beam light scattered off material surfaces depend on microstructure and roughness of the illuminated powder particles, on molten pool surface properties, and on characteristics of the metallic surface of the processed track. These backscattered light characteristics, as measured by the material sensors, could be used for LAM process characterization and adaptive beam shaping.

Disclosed herein is a method for in situ characterization of materials consolidated into a metal track during LAM process using analysis of the probe laser beam scattering off the material. The disclosed sensing method may also be used for the LAM process parameter optimization and feedforward control. In this method for the processed track characterization the appearance of balling defects in the consolidated metal is indicated by the presence of relatively low frequency and deep fluctuations in the received signal, while an increase in number of not fully melted, sintered powder particles and/or material porosity could be seen via a general decrease in the received signal average value. This, received from the material sensor data, can be utilized for feedforward and feedback control and optimization of LAM parameters during manufacturing process.

Also disclosed herein is a method for molten pool characterization during the powder bed metallic SLM with the described material sensors. Under ideal (desired) LAM processing conditions, the molten pool is spatially uniform (doesn't contain disconnected balls), occupies the largest possible (for fixed total laser power) area inside the combined multi-beam footprint, and doesn't have evaporative flows and splatters. For these ideal conditions, the largest portion of power of the backscattered probe laser light is reflected from the molten pool, which behaves as a mirror surface. For a probe beam slightly tilted with respect to the axis that is orthogonal to the material surface, the light reflected from the molten pool misses the PIB type optical receiver, resulting in a low PIB metric value. The appearance of inhomogeneities inside this "perfect" molten pool, regardless of their cause (fluid flows, balling defects, splatter, etc.), will result in a decrease of the mirror-reflected backscatter light component and wide-angle light scattering off these inhomogeneities. This, in turn, will cause a corresponding increase in the registered PIB signal. Similarly, if the molten pool is too small and/or the beam footprint on the material surface covers a significant portion of non-consolidated into metal powder or sintered particles, light scattering off these particles will result in a larger PM metric signal value.

These physics-based considerations suggest that minimization of the registered PM metric signal with feedback control of the beam shaping parameters described below could result in the formation of a smooth optimally sized molten pool and thus high-quality LAM-produced parts. Note that due to the finite response time of metallurgical processes on the control system-induced changes in the laser beam intensity distribution, adaptive beam shaping may be based on minimization of the time-averaged PM metric signal.

The molten pool formed during the described adaptive beam shaping process based on PM metric minimization may be consolidated into a shape that is not optimal or even acceptable from the view point of high-quality part manufacturing. Certain constraints on the control parameters can be additionally imposed to keep the molten pool within a desired shape (e.g., a rectangle elongated along the processing direction). These constraints may include limitations on the possible deviation of the control parameters from the pre-selected values. Thus, monitoring of the PM signal of the molten pool sensor offers a method disclosed here for in situ the molten pool characterization and real-time LAM process optimization via feedforward and/or feedback control of multi-beam intensity distribution.

Capabilities of AMBFA-LAM device (300) for control of laser power spatiotemporal distribution at the material surface—also referred to as beam shaping—may include: control of the projected to power bead surface, or other point of manufacture, control of centroid coordinates, control of radii, control of steering parameters of focal control of polarization states of processing, and control of piston phases of the transmitted beams. To simplify notations the set of control parameters that are used for beam shaping are denoted here as $\{u_m\}$, where m=1, . . . and M is the total number of controls utilized for a particular beam shaping task. Note that dependent on the AMBFA-LAM device (300) configuration and beam shaping needs the control capabilities may include all [(a) through (e)] the described above options, or be limited by a selected set of them.

Figure 16:
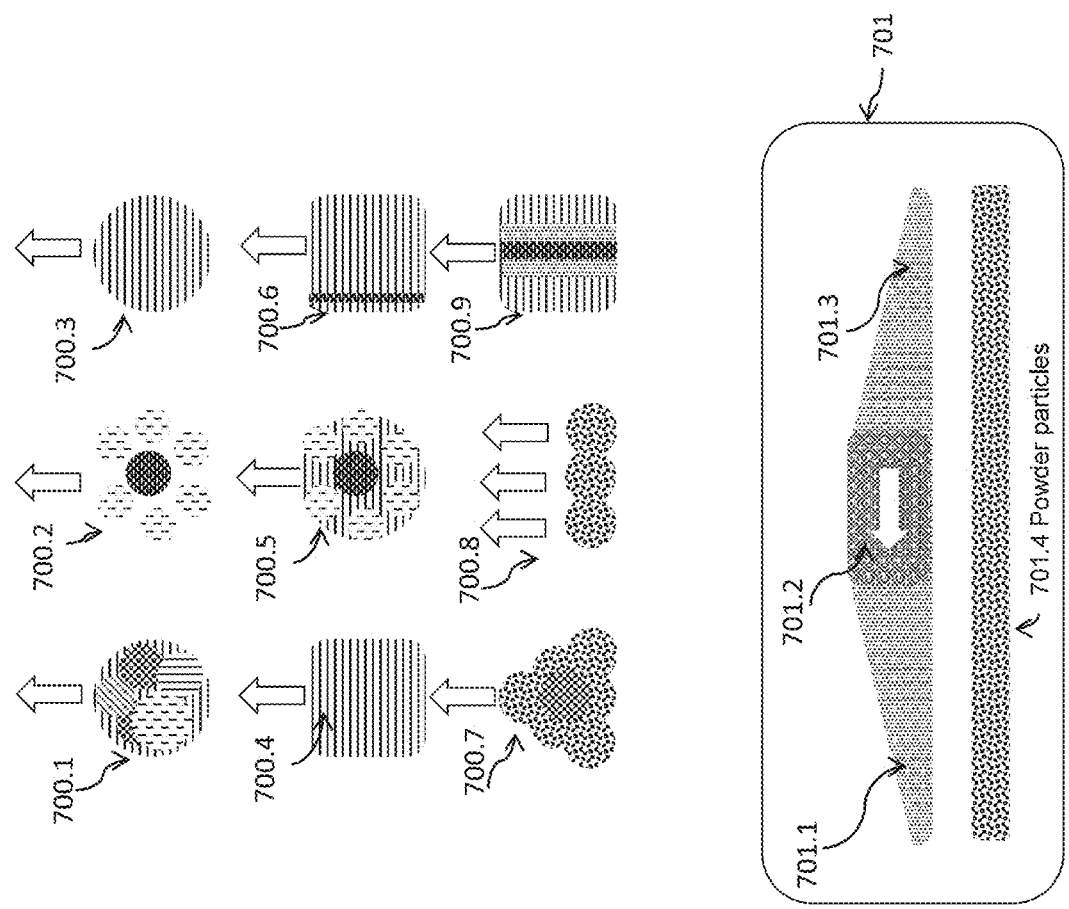
FIG. 16 is a diagram view showing a variety of exemplary beam shaping methods that an AMBFA-LAM device is capable of performing.

The disclosed beam shaping methods of the AMBFA-LAM device (300) are illustrated in FIG. 16. They include but are not limited by incoherent combining with overlapping of all or several beams, and multi-beam phasing (also referred to as coherent combining) leading to the reduction of focal spot size and corresponding increase of power density at the work piece. The drawings (700.1) and (700.2) in FIG. 16 illustrate the processing beam focal spots at the material surface with incoherent, also known as non-phased (700.1), and coherent, also referred to as phased (700.2), combinations of seven beams. Note that multi-beam phasing results in the appearance of side-lobes located a distance from the processing beam central-lobe as shown in the drawing (700.2). Other examples include controllable randomization of the multi-beam piston, control of spatial distribution of the laser power density at material surface using stair-mode beam scanning technique, superposition of highly localized beam for material melting and wide beam for surface treatment, powder material melting with simultaneous pre-heat of the powder particles and annealing of the consolidated into metal material can be achieved by the disclosed beam shaping method of controlling multi-beam focal spot centroid coordinates $\{r_j\}$, and/or radii $\{\alpha_j\}$, and/or powers $\{p_j\}$, and/or beams steering parameters $\{s_j\}$, $\{\theta_j\}$, and $\{\omega_j\}$. The drawings (700.7), (700.8) and (700.9) in FIG. 16 give examples of this beam shaping method including: (a) multiple beams in triangle shape (700.7) for pre-heating, and cooling rate control; (b) the multiple beams in line (700.8) for faster LAM processing and productivity increase and for control of cooling and heating rate; (c) the ramp-shape intensity distribution illustrated by the drawings (700.9) and (701). This shape of beam can be obtained using various beam shaping techniques disclosed, e.g. by scanning of multiple beams with their partial overlapping. In ramp-shape beam gradual intensity increase is used for pre-heating, high uniform power density for melting, and gradual intensity decrease for molten pool cooling.

Figure 17:
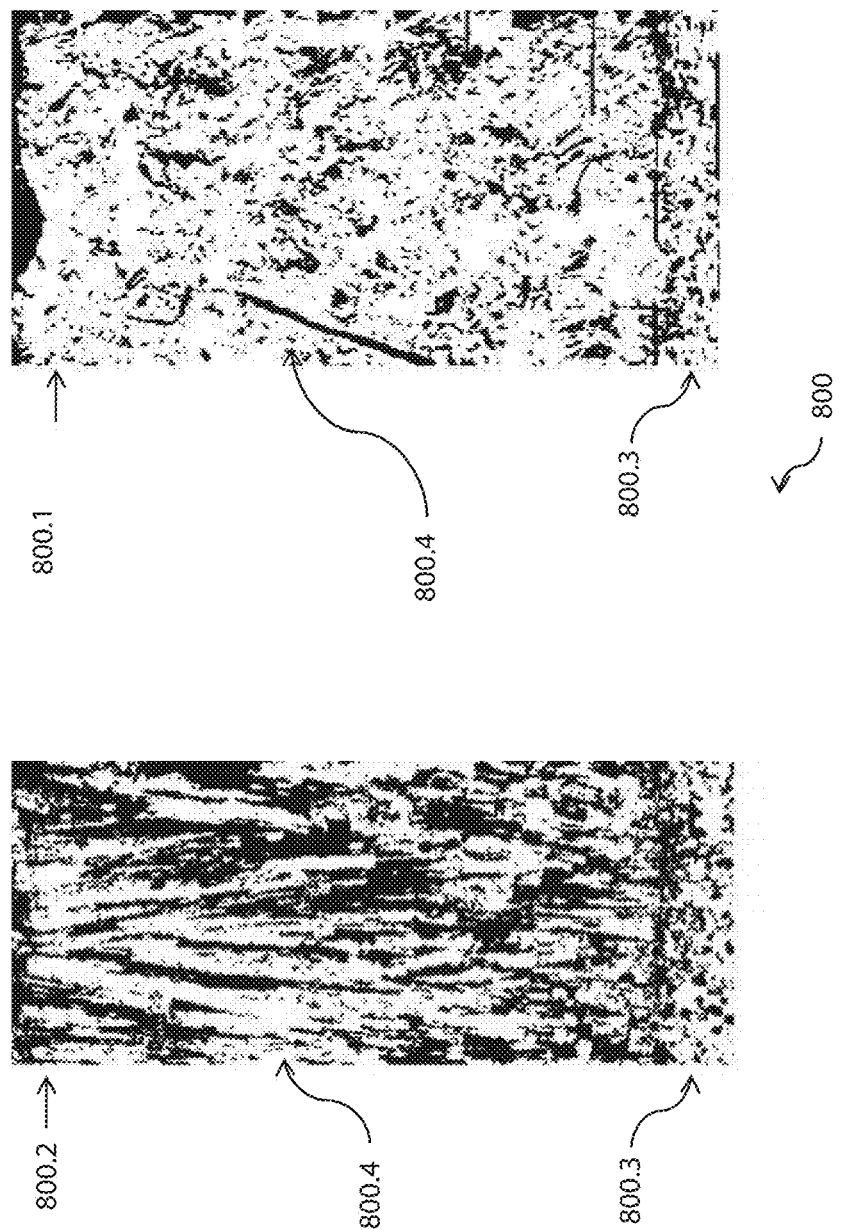
FIG. 17 is a visualization of experimental evidence of material microstructure control using 7-beam AMBFA-LAM system that utilizes beam shaping methods of FIG. 16 showing distinct difference in material microstructure between the results obtained with conventional single-beam SLM processing method (left) and using multi-beam SLM processing (right)

The disclosed beam shaping methods leading to powder material melting with simultaneous pre-heat of the powder particles and/or annealing of the consolidated into metal material could be utilized for control of the material microstructure and can be used for engineering of LAM-produced parts with space-varying material micro-structure and mechanical properties. The experimental evidence of distinct difference in controlling the growth of gamma grain of IN718 alloy on the base plate (800.3) with SLM processing of powder material using the disclosed methods of beam shaping is illustrated in FIG. 17. The electron backscatter diffraction (EBSD) inverse pole figure (IPF) maps (800) obtained with scanning electron microscope show radically different the columnar microstructure in two samples, one (800.1) processed using conventional SLM method and the second (800.2) using beam shaping with seven beams in square shape. Note the small equiaxed grains in the IPF map (800.2) compared to the very large gamma-type grain structure of the deposited material (800.4) on the IN718 baseplate (800.3) in the IPF map (800.1). The results in FIG. 17 were obtained using an exemplary prototype of the disclosed AMBFA-LAM device (300) as the laser source.

Figure 18:
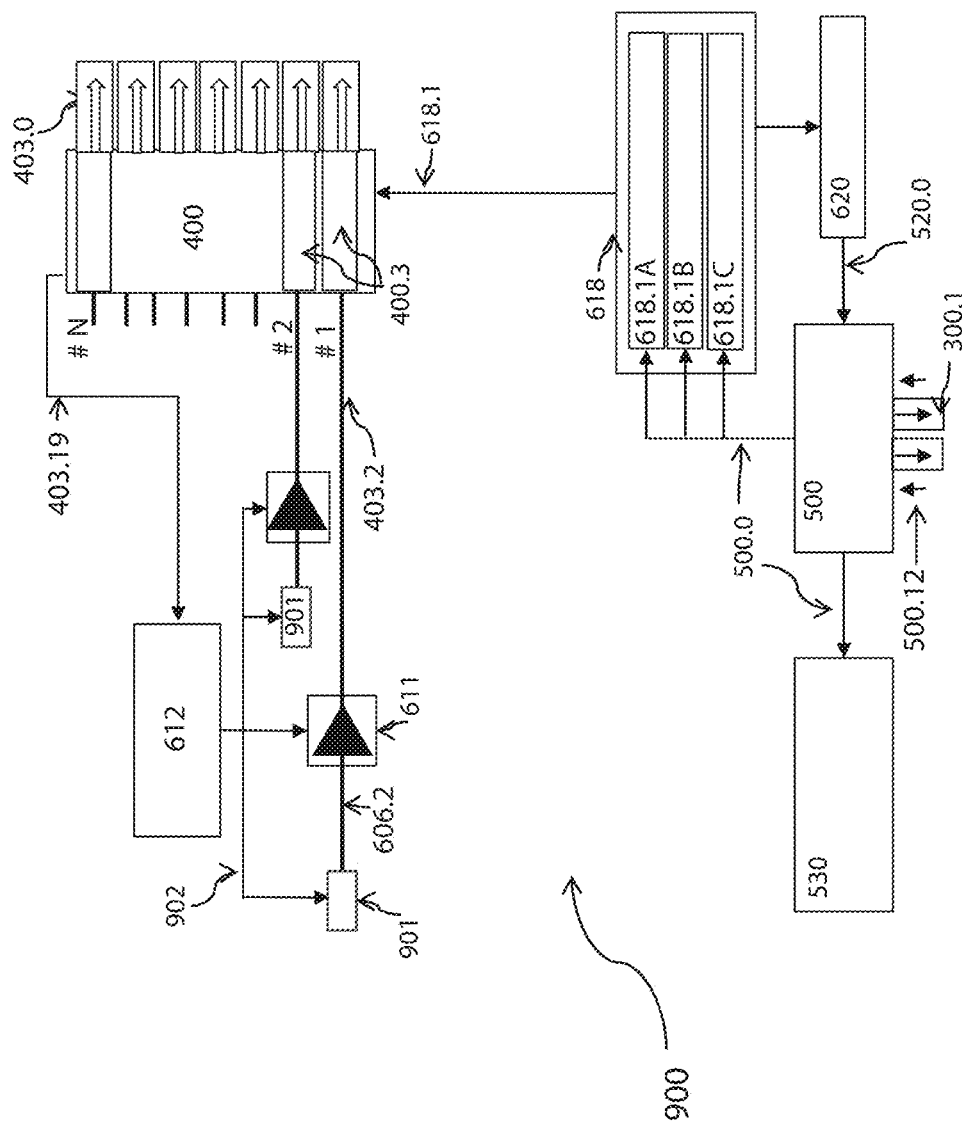
FIG. 18 is a schematic block-diagram of an exemplary AMBFA-LAM device that utilizes incoherent multi-channel optical power amplifier (IMOPA) system with controllers for multi-beam adaptive shaping.

Reduced number of the described beam shaping methods could be implemented using a simplified option for the MOPA system (600) in FIG. 8. This, referred to as incoherent MOPA (IMOPA) system (900), is illustrated by FIG. 18. The IMOPA utilizes independent fiber channels comprised of either fiber coupled lasers (901), or with the fiber lasers with additional fiber amplifiers (611). Control of the transmitted multi-beam powers could be performed either applying the power control signals (902) to the fiber coupled lasers or to the fiber amplifiers. The beam shaping controllers of the IMOPA systems (except piston phase and polarization controllers) in FIG. 18 are identical to the described controllers of the MOPA system in FIG. 8.

V. Spatiotemporal Control of the Multi-Beam Laser Power Distribution for LAM

One of the major potential issues with programmable beam shaping is that it requires the laser system and SLM process parameters to be exactly known and fixed in time.

Under actual LAM conditions, there are always uncertainties and variabilities in the stock material characteristics, shape and power of the transmitted beams, errors in beams pointing, etc. A schematic diagram of the adaptive beam shaping systems that utilize the multi-beam control capabilities (e.g., as described above with reference to FIG. 16) of the AMBFA-LAM device (300) are illustrated in FIG. 8, FIG. 18 and FIG. 19.

Figure 19:
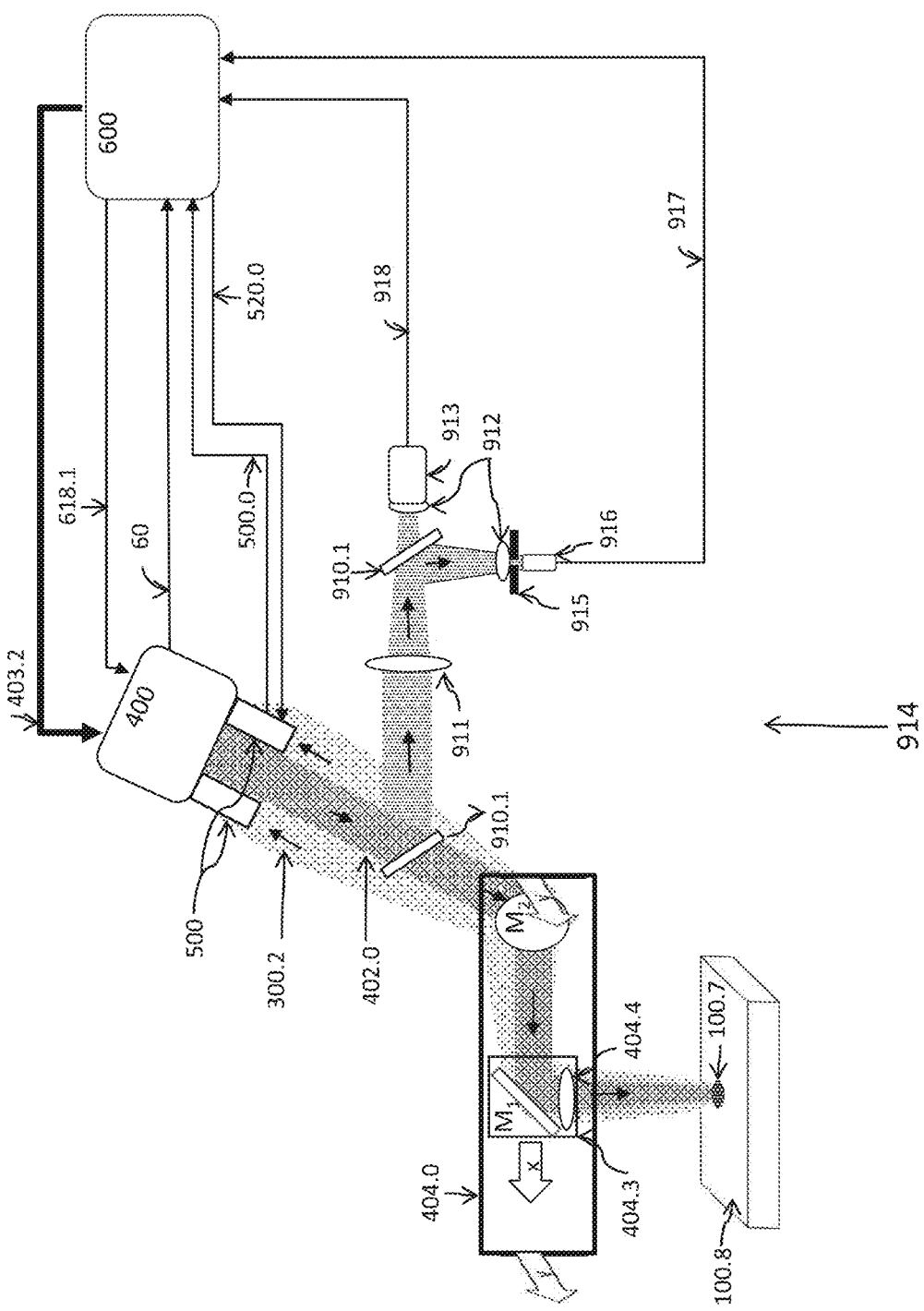
FIG. 19 is a notional schematic of an exemplary adaptive beam shaping system having multi-beam control capabilities.

In the adaptive beam shaping system (914) in FIG. 19 a beam splitter (910.1) redirects a small portion of the processing laser beam (402.0) power to an optical image forming system (911), e.g. a lens, that creates a scaled copy of the laser beam focal spot (100.7) intensity distribution at the photo-array (913), referred to as a conjugate image of focal spot (912). The photo-array is capturing the conjugate images of intensity a $\alpha$ I($\beta$ r, $t_n$) at sequence of time $\{t_n\}$, (n=1, ... ) with a time interval $\Delta t$. The captured image $\alpha$ I ($\beta$ r, $t_n$) represents a scaled copy of the intensity distribution I(r, $t_n$) at the material surface, where $\alpha$ and $\beta$ are pre-defined and known scaling factors. The captured images $\{\alpha$ I($\beta$ r, $t_n$)$\}$ are digitized and the corresponding signals (918) are sent to the beam shaping controller (618) of the MOPA system (600). Using available data including the captured images $\{\alpha I(\beta$ r, $t_n$)$\}$, scaling factors $\alpha$ and $\beta$, and the desired (reference) intensity distribution function $I_{ref}$ (r), the beam shaping controller (618) computes an error metric. The same controller (618) iteratively updates the beam shaping control parameters, e.g. $\{r_j\}=\{x_j, y_j\}$, $\{\alpha_j\}$ and $\{p_j\}$ (j=1, ..., N) to minimize the error metric. The beam shaping control parameters update is performed using one or another optimization algorithm (e.g., such as an SPGD optimization algorithm).

An additional sensing module in FIG. 19 that is composed of the beam splitter (910.1), mask with pin-hole (915) and photo-detector (916) could be used for practical implementation of the described above beam shaping methods (e.g., B through E, as described above with reference to FIG. 16): Multi-beam phasing (B); Controllable randomization of the multi-beam piston phases (C); Control of spatial distribution using stair-mode beam scanning technique (D); Switching between coherent and incoherent beam combining operational regimes referred to as time-multiplexing beam shaping method (E). To implement these beam shaping methods the signal from the photo-detector (917) is sent to the piston phase controller (615) of the MOPA system (600). Maximization of this signal using a phase locking algorithm, SPGD for example, would result in phasing (coherent combining) of transmitted by the fiber array laser head (400) beams at the photo-detector (916) and hence at the powder bed surface (100.8) or other material surface. The same signal (917) can be used to maintain coherent combining of multiple beams at the material surface with additional stair-mode beam steering signals applied to the phase shifters (607). The time-multiplexing controller (616) provides switching between coherent combining, incoherent combining and controllable randomization of the piston phases thus implementing the described above beam shaping methods (e.g., B through E).

VI. Exemplary System with Two-Dimensional Matrix of Scanning Beams

One limitation of existing LAM technologies such as laser powder bed fusion (LPBF) is the nature of the powder material melting process using a single sharply focused and rapidly moving or scanning laser beam. Due to rapid melting and directional solidification of a highly localized melt pool during conventional LPBF processing, the microstructure and mechanical properties of fabricated parts are extremely difficult to control, and may result in undesired microstructures, presence of cracks, unacceptably high material porosity, residual stress, and surface roughness. Another significant drawback of the existing LPBF technology is slow build rate that typically doesn't exceed 25 $cm^3$/hour.

Figure 20:
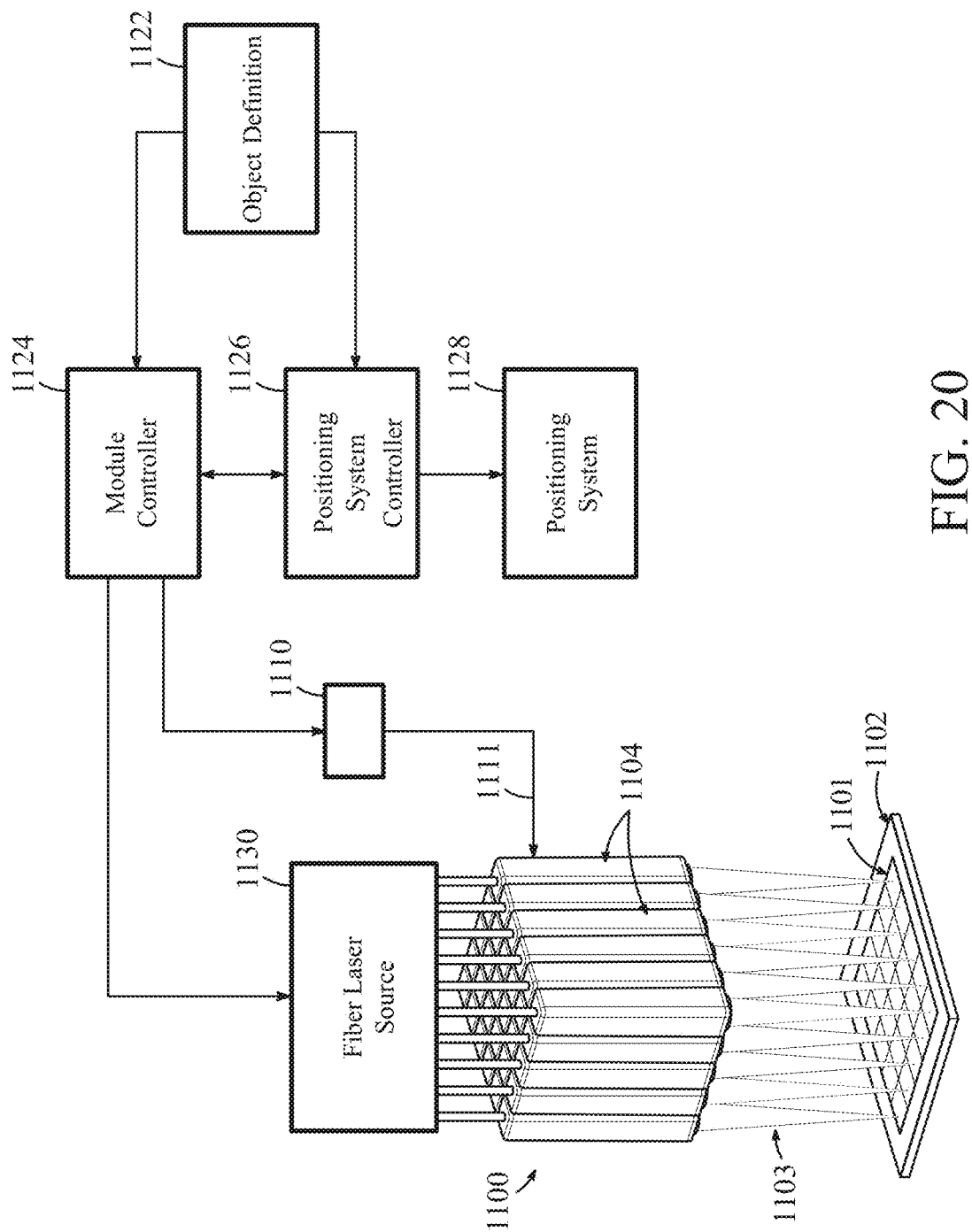
FIG. 20 shows a schematic diagram of an exemplary matrix of scanning laser beams (MSLB)

A two-dimensional array of scanning laser beams, also referred to as a matrix of scanning laser beams (1100) (MSLB), as shown in FIG. 20, allows parallel processing of an extended area (1101) of the powder material layer (1102) with LPBF type LAM. In some implementations, the processing area (1101) may include the entire area of the powder material layer (1102). Such a laser system composed of a matrix of scanning laser beams allows for a significant increase in build rate, as well as improved control and significant reduction of thermal gradients within the heat affected zone (HAS) resulting in better quality of produced parts. The MSLB (1100) may also be used for applications other than LPBF that benefit from a processing area that may be variably sized as needed. As an example, this may include laser surface treatment to remove paint or other materials from a base surface without damaging the base surface. As another example, this may include etching or building textures on a base surface that provide varying advantageous characteristics such as passive resistance to housing or spreading bacteria.

Use of the MSLB allows simultaneous projection of a plurality of scanning laser beams (1103) onto the powder material layer (1102) as illustrated in FIG. 20. An MSLB (1100) includes a densely packed matrix of N×M fiber-laser based micro-scanner modules (MSMs) (1104). An exemplary MSLB in FIG. 20 is configured as a square matrix with N=5 and M=5 MSMs. Each MSM (1104) produces a laser beam (1103) focused at the powder material layer (1102) as additionally illustrated in FIG. 21, and provides capabilities for control of the projected laser beam power, focal spot (1105) x- and y-position and scanning characteristics such as for example scanning amplitudes and frequencies within a dedicated for each MSM processing area (1106) at the powder material along x- and y-axis. A matrix of laser beams (1103) projected by the MSLB (1100) can process a powder material within the build area (1101) composed of a plurality of discrete densely packed sub-regions or processing cells (1106), as illustrated in FIG. 21. Each single MSM (1104) processes powder material within a single material processing cell (1106). The MSMs (1104) may be arranged and assembled such that there is a commonly shared distance (1107) between the centers of adjacent material processing cells, which may be referred to as the MSLB pitch. As will be described in more detail below, each MSM (1104) includes a laser beam scanning element that provides controllable displacement of the focal spot (1105) along an x and y axis at the plane of the powder layer. A laser beam scanning element may be implemented in varying ways depending upon the particular MSM (1104), and the MSM (1104) may itself be implemented in varying ways. AS an example, the MSM (1104) may include one or more optical components (e.g., a fiber tip, a lens) arranged along an optical axis, while the beam scanning element may include one or more actuators (e.g., a piezo actuator, linear actuator, motor, or other component) that are operable to change the position of one or more of the optical components.

FIG. 20 also shows an LPBF system (1100.00), which includes an object definition source (1122) that may provide or provide access to object definition data that describes a work piece (e.g., a three-dimensional CAD model or other dataset), and that may include additional meta-data describing LPBF specific parameters relating to the creation of the work piece (e.g., beam configurations, laser power characteristics, laser sensing and feedback configurations, as has been described). The LPBF system (1100.0) may include one or more processors or controllers, and such processors or controllers may be integrated into a single computing system or spread across several interconnected computer systems, as will be apparent to those of ordinary skill in the art in light of this disclosure. A module controller (1124) and a MSLB positioning system controller (1126) may be different computing systems or sub-controllers or sub-processes of the same computing system. The MSLB module controller (1124) is configured to control operation of the MSLBs (1100) laser beam scanning elements and operation of a fiber laser source (1130) that is fiber-coupled to the MSLB (1100) in order to provide laser power to the MSMs (1104). In this manner, the module controller (1124) may coordinate the focal spot positions, motion velocity in both x and y directions and laser power during scanning and processing of powder material within the cells (1106), based on the object definition (1122) and other data.

The positioning system controller (1126) may be in communication with the module controller (1124), and may operate a positioning system (1128) in order to position the build surface (1102) and the MSLB (1100) relative to each other during LPBF processing. The positioning system (1128) may include automated gantries or other systems capable of moving the MSLB (1100), the build surface (1102), or both in one or more directions relative to each other. As an example, this may be useful where the MSLB (1100) is capable of processing a 225 cm$^2$ build surface, but the build surface (1102) itself is 450 cm$^2$. In such a case, the MSLB (1100) may start over top a first half of the build surface (1102) and complete processing of that region, and then may be moved to a second half by the positioning system (1128) in order to finish processing that region and layer. While the positioning system (1128) is capable of repositioning the MSLB (1100) during LPBF processing, one advantage of the MSLB (1100) is that repositioning of the entire MSLB (1100) while laser processing is ongoing, is not necessary due to the combined area of the cells (1106), and so a sequential processing and then repositioning of the MSLB (1100) is possible.

Operation of the laser beam scanning element of an MSM (1104) allows the focal spot (1105) to be rapidly and independently displaced along an x-axis and y-axis to one or more positions (e.g., where a position is an x-y coordinate pair) within the cell (1106), and simultaneous operation of all MSMs (1104) allows for simultaneous processing of material located (e.g., a powder layer) at multiple positions across each of a plurality of cells (1106), e.g., nine cells with a 3×3 matrix, 100 cells with a 10×10 matrix, and so on. Since the processing region of each cell (1106) is adjacent to another this allows for simultaneous LPBF processing of a powder material layer equal to the area of a cell (1106) multiplied by the number of MSMs (1104) in the MSLB (1100). This allows for rapid LPBF processing, as compared to conventional approaches where a single laser beam might be rastered across the entire processing area by operation of a galvo scanner, gantry or other positioning system. As an example, an implementation of an MSLB (1100) laser power source with a 10×10 configuration of MSMs (1104) arranged in a square grid with the distance (pitch) (1107) between centers being 1.0 cm allows for simultaneous processing, without repositioning of the MSLB (1100), of a powder layer of 100 cm$^2$. This processing rate allows for acceleration of LPBF build rate compared to a single laser beam for processing the same (10×10 cm$^2$) size powder material layer, and is flexibly scalable to support processing regions of varying sizes (e.g., by varying one or more of the number of MSMs (1104)).

FIG. 21 shows an example of an individual MSM (1104) such as may be included in the MSLB (1100). A focusing lens (1108) and/or a laser beam forming optics receives the laser beam through a delivery fiber (1109) and focuses it onto the build surface (1102). As the x/y position of the delivery fiber tip or other optical element of the beam forming system inside MSM (1104), which may also include the focusing lens (1108) itself, changes relative to the optical axis of focusing lens (1108), the position of the focal spot (1105) on the build surface changes allowing for processing of powder material located at any coordinate within the cell (1106). The MSM (1104) also includes a control circuit (1110) in communication with the module controller (1124) and capable of creating or providing control signals (1111) to cause displacement of the laser focal spots (1105), and may also include sensors or other devices used by the MSM (1104) during operation. The MSM (1104) includes an element or part or base (1112) that defines an external footprint of the entire MSM (e.g., 1.0 cm by 1.0 cm). With the processing region of each cell (1106) adjacent to another, the MSMs (1104) packed together and attached to each other, and the footprint of each base not exceeding the corresponding processing cell (1106), the MSLB (1100) is capable of simultaneous LPBF processing of a powder material layer equal to the area of a cell (1106) multiplied by the number of MSMs (1104) in the MSLB (1100).

Figure 22:
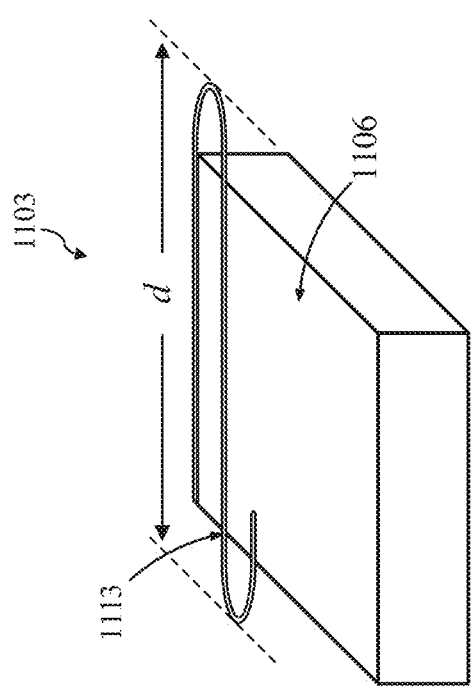
FIG. 22 shows a schematic diagram that illustrates beam scanning along two axes by the MSM of FIG. 21.

FIG. 22 shows a schematic diagram of a trajectory (track) (1113) of the projected focal spot (1105) resulting from its scanning along the x and y axis of the build surface (1102) in an area corresponding to the cell (1106). Some implementations of the disclosed MSM and LPBF system may be designed with a scanning frequency of 100 Hz, a scanning track length (1114) d=1.5 cm in length (along one axis), single track scan time of 5 msec, scanning speed of 3 m/sec, track width (e.g., focal spot) of 130 μm, powder layer width of 50 μm, approximately 70 tracks within the processing area (e.g., the cell (1106)), 0.4 seconds to process a single powder layer, and 200 layers per 1.0 cm thick material. With such an implementation, each MSM may be capable of melting 1.0 cm thickness of material across the cell in 80 seconds, with powder loading times of around 400 seconds, resulting in the ability to print a 100 cm$^3$ slab work piece in about 8 minutes, which represents a significant improvement over conventional LPBF approaches. The above specifications and configurations are exemplary only, and may be varied in each implementation depending upon various factors (e.g., application, cost).

Figure 23:
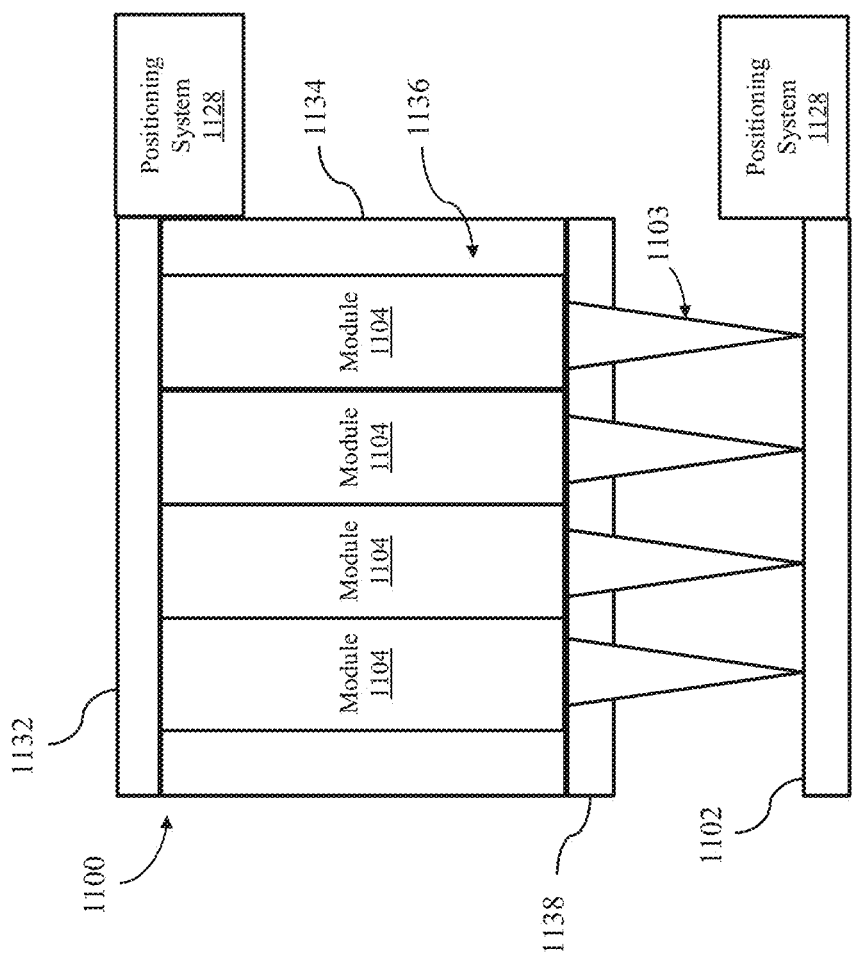
FIG. 23 shows another schematic diagram of the MSLB of FIG. 20.

FIG. 23 shows another schematic diagram of the MSLB (1100). The positioning system (1128) may be operable to reposition the MSLB (1100), the build surface (1102), or both, as has been described. Particular implementations of the MSLB (1100) will vary depending upon the number of MSMs, the type of MSM, any additional lens or other optical components integrated with the MSMs, and other factors. The implementation shown in FIG. 23 includes a frame (1134) that is adapted to hold a plurality of MSM modules (1104) in a densely packed matrix (1136), such that movements and vibrations are isolated, and such that the footprint of each MSM (1104) when installed within the frame (1134) is unchanged (e.g., a ten-by-ten matrix of MSMs that each have a footprint of 1.0 cm will occupy an area within the frame substantially matching 100 cm$^2$, though the frame (1134) itself may be larger). An interface (1132) may be part of the frame (1134) and may assist in holding all MSMs (1104) together and isolating motion or vibration, and may also provide a channel or connections for fiber delivery, control signal delivery, or other communications between the MSLB (1100) and other devices. A beam interface (1138) may be part of the frame (1134) and may hold a plurality of lenses (1108) in place relative to the MSM matrix (1136), as shown in FIG. 23.

In some exemplary implementations of the disclosed system, if each MSM (1104) of the MSLB (1100) transmits 0.2 kW laser power, the total laser power projected to the powder material could be as high as ~20 kW with the average laser power density at the powder material 90 W/cm$^2$. This level of laser density could generate high levels of heat flux inside the processing material and powder bed chamber. As will be described in more detail below, some implementations of the MSLB (1100) may reduce the required laser density by utilizing a pre-heated build surface and/or powder layer that is preheated slightly below powder sintering temperature, such that melting of the powder during operation will require significantly lower laser power and density, allowing heat flow to be more spatially homogenous and nearly stationary.

Powder layer pre-heating can be achieved in various ways, such as via vertical displacement of the lens array or other optical elements from their nominal position resulting in defocusing of laser beams. With large enough defocusing the beam footprints would cover the corresponding processing regions at the powder material thus providing nearly uniform laser power density inside the entire powder layer. During a pre-heating phase, the MSMs (1104) may be operated to produce larger focal spots that may be statically positioned, or that may be scanned to provide selective heating of some or all of the build surface. The displaced position and defocused footprints can be held until a desired pre-heating temperature is reached. Pre-heating may also be achieved by pre-heating the entire build surface, or a portion of the build surface, using internal or external heating elements (e.g., resistance heating coils within the build plate, below the build plate, or on or near the surface of the build plate) or other power sources.

Providing the capability to control and adjust heat levels at the build surface may also include the use of high efficiency heat exchange elements incorporated into the build chamber, such as high conductivity heat transfer surfaces and micro-fins. Micro-fin-based heat exchanger cells may be advantageous due to their high ratio of heat transfer to area, simplicity, small footprint, and high flexibility and freedom of design to manufacture micro-fin structures with different fin shapes and densities, scalability in size and fast prototyping.

Figure 24:
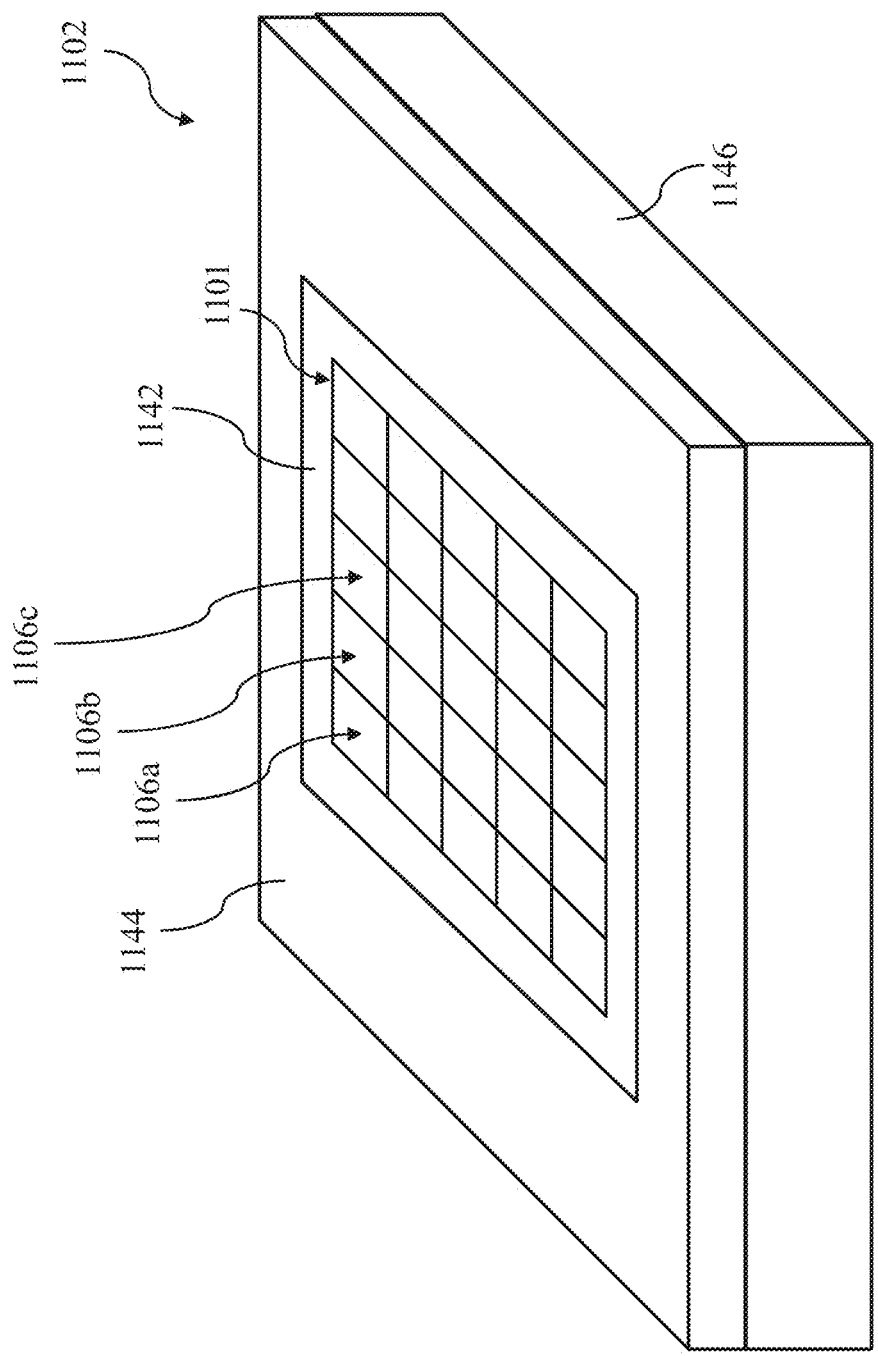
FIG. 24 shows a schematic diagram of an exemplary build surface of the MSLB of FIG. 20.

FIG. 24 shows a schematic diagram of an exemplary build surface, such as the build surface (1102), that includes one or more heat management features. The build surface (1102) includes a build plate (1144) with a work area that corresponds to a plurality of processing cells (1106a, 1106b, 1106c, etc.) that may be simultaneously processed by the MSLB (1100). A surface heater (1142) is positioned proximate the work area and is operable to pre-heat powder material in the work area so that laser power density during processing may be reduced and/or powder material temperature could be more uniformly distributed across the processing area (1101). A surface heater (1142) may include one or more coil heaters around the build surface (1102) under that surface to minimize the temperature gradient between the edge and the middle processing cells (1106a, 1106b, 1106c, etc.). An internal heater (1146) is positioned proximate the build plate (1144) and is operable to pre-heat the build plate (1144), the powder material, or both, in addition to or as an alternative to the surface heater (1142).

FIGS. 25A-25E show various views of an MSM (1200) that is one possible implementation of the MSM (1104) that has been previously described, and such as may be included in the MSLB (1100) of FIG. 20. In this embodiment, the light propagates through optical fiber before getting focused on the build surface (1102) by an optical beam (focal spot) forming system e.g. a lens. In this specific MSM (1200), the end section of the delivery fiber is located within a tube or a ferrule (1203). That tube or ferrule (1203) is connected to a pair of piezoelectric actuators (1206, 1208) by a flexure (1204) to be positioned within the cavity (1226) of the MSM's base (1210). The ferrule or tube (1203) may be made of a thin glass or other materials (e.g., plastics, metals), and may be formed with the delivery fiber embedded within or may be formed with a hollow that receives the delivery fiber. The tower (1210) is mounted on a base (1212) that defines the outer edge and footprint of the entire MSM (1200) (e.g., the base (1212) is the widest portion of the MSM (1200) on each side when observed from above as in FIG. 25B). An electronic circuit (1214) receives control signals and controls displacement of an x-actuator (1206) and a y-actuator (1208). An electrical connector (1216) includes connections for receiving control signals, electrical power, and other communications. A flexure (1204) couples the end section of the delivery fiber located within a tube or a ferrule (1203) with the x-actuator (1206), and the y-actuator (1208) to each other so that displacements of one or both actuators will direct the fiber tip as desired. The actuators may be implemented as, for example, piezo-actuators, including bimorph piezo actuators or by coil type actuators or some other actuators.

During operation, the actuators (1206, 1208) displace the fiber tip in a first or second direction by applying a control voltage. As an example, the actuator (1206) bends in either of two directions along an x-axis in response to varying control voltages, while the actuator (1208) bends in either of two directions along a y-axis in response to applied control voltages. Each actuator (1206, 1208) may be coupled to the fiber tip (1202) resulting in the laser beam exiting the fiber tip being projected onto the processing region during material processing, and so providing varying control voltages to the x-actuator (1206) and the y-actuator (1208) allows the fiber tip (1202) to be placed at any desired x-y coordinate offset from its origin. The delivery fiber may be located inside a ferrule (e.g., a tube) made of glass, metal, or another material that may be attached to the base at one end and coupled to the actuators at the other end with a fiber tip being exposed at a distal tip of the ferrule.

FIG. 25B shows a top down view of a possible MSM (1200) in which a pair of piezoelectric plates are used as actuators (1206, 1208). It can be seen in this embodiment that the base (1212) defines the dimensional footprint of the MSM (1200), which allows them to be densely packed when assembled within the MSLB (1100). FIG. 25C shows the flexure (1204) removed from the MSM (1200). The actuators (1206, 1208) displace the fiber tip and or a ferrule with the delivery fiber through the flexure (1204). The flexure (1204) is made of a flexible material such as flexible metals, polymers or other materials, and allows displacement of the actuators to be transferred to the displacement of the fiber tip, and also provides a bias towards a neutral or original position when the actuators (1206, 1208) are not actively displaced. The flexure (1204) arms' (1222a, 1222b) length, shape, cross-section, and weight may be optimized to transfer the displacement from the actuators (1206, 1208) to the optical element (e.g., the fiber tip (1202), via the ferrule (1203)). Further, it should be understood that in varying implementations flexures may be implemented with varying sizes, shapes, materials, and other characteristics in order to provide a desired range of displacement of a fiber tip (1202) in response to displacement of the actuators (1206, 1208), and so the flexure (1204) is an example only. The flexure (1204) is attached to the actuators (1206, 1208) by a set of hooks at the distal ends of the arms (1222*a*, 1222*b*) that are coupled to the optical element (e.g., the fiber tip (1202) and ferrule (1203), but in some implementations a lens or other component) with a coupling (1224), to transfer the displacement from the actuators (1206, 1208) to displace the optical element. FIG. 25D shows a top down view of the MSM (1200) with the flexure (1204) removed. FIG. 25E shows the MSM (1200) from an elevation view, with the flexure (1204) removed.

FIGS. 26A-26E show an exemplary alternate MSM (1230). A comparison of the MSM (1200) and the alternate MSM (1230) makes apparent that the size, shape, and position of components may be varied in particular implementations (e.g., a tower may be centered or offset on the base, actuators may be of different shapes or positions, etc.). A fiber tip (1232) is positioned at a distal end of a ferrule (1233) or shaft, similar to the ferrule (1203), that extends from the tower (1240), and which holds a delivery fiber for supplying laser power to the fiber tip (1232). The tower (1240) is offset from the center of the base (1242), which itself defines the footprint (e.g., or the pitch) of the MSM (1230) as described above. As can be seen from FIGS. 25A and 26A, the structure of an MSM such as the MSM (1230) may be varied in order to support any size, shape, position, or configuration of the actuators and flexure (e.g., a tower height or shape may be changed, the tower position extending from the base may be changed, etc.). An x-actuator (1236) and a y-actuator (1238) extend from the base (1242) and are selectively displaceable based on control signals, as has been described. A flexure (1234) couples the x-actuator, y-actuator, and the fiber tip (1232) together. Notably, the flexure (1234) includes a set of hooks (1243*a*, 1243*b*) and a fiber tip or ferrule holder (1244) that is integrated with the body of the flexure (1234) (e.g., as opposed to the offset flexure (1204)). The fiber tip holder (1244) is positioned again to center the fiber tip (1232) within the channel (1250). Differing flexures, fiber tip positions, tower sizes, actuator characteristics, and other physical characteristics may be selected to define the range of motion of the fiber tip under actuator displacement, and may be selected to limit the range of motion to confine processing within a corresponding cell (1105).

Figure 27A:
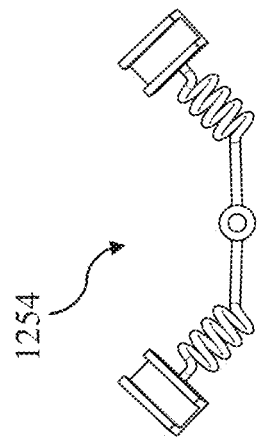
FIG. 27A shows a perspective view of the flexure of FIG. 26C.
Figure 27B:
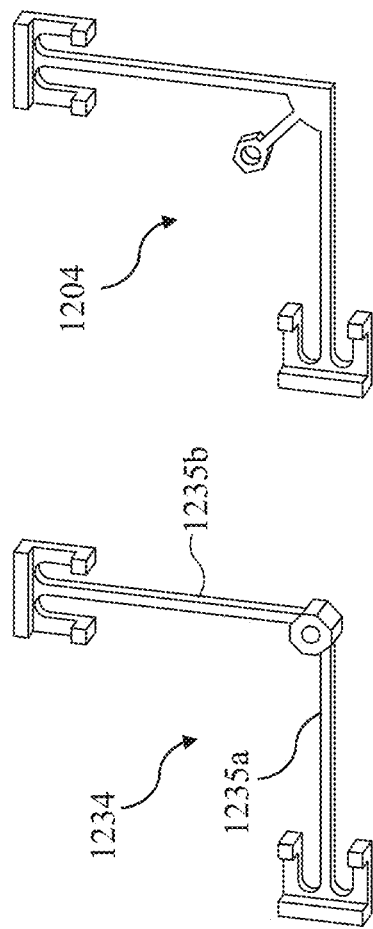
FIG. 27B shows a perspective view of the flexure of FIG. 25C.

FIGS. 27A-27E each show different types of flexures. FIG. 27A shows a perspective view of the flexure (1234), while FIG. 27B shows a perspective view of the flexure (1204). As mentioned, design considerations for a flexure should include optimal transfer of the displacement of the actuators to the optical elements. Therefore, a advantageous flexure characteristics may include, for example, lightweight, flexibility, and fatigue resistance. Flexures including some or all of these characteristics may be implemented through selections of materials and shapes. The shape of the flexure will have a strong influence on flexibility, fatigue resistance, and mass.

Figure 27C:
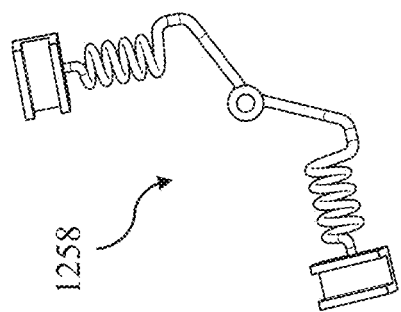
FIG. 27C shows a perspective view of an alternate exemplary flexure.
Figure 27D:
FIG. 27D shows a perspective view of another alternate exemplary flexure.

In some implementations, a flexure may include thin but long arms (e.g., such as the arms (1235*a*, 1235*b*) of FIG. 27A) or spring shaped arms (e.g., such as shown in FIG. 27C and elsewhere). Long arms provide higher flexibility but, at the same time, increase the weight of the flexure and potentially decrease operational frequency bandwidth. Thin arms provide higher flexibility and reduce the weight but at the same time, lower the fatigue strength. Therefore, all parameters may be considered when designing the optimum flexure for a specific MSM. The flexures (1254) and (1258) of FIGS. 27C and 27E incorporate spring biasing portions in the body of the flexure to provide an extended length in a short arm considering the maximum allowable weight. A flexure (1256) of FIG. 27D shows a different hook shape adapted to clasp a particular actuator tip, and which may reduce the weight compared to actuators having other hook types. The varying shapes and features of each flexure may be selected for a particular implementation or application depending on the required range of the fiber tip displacement for that application, and may also be selected to hold the fiber tip or a ferrule at a neutral position in varying places relative to the base of an MSM (e.g., as illustrated in FIGS. 25B and 26B, where the fiber tip (1202, 1232) or other optical element is positioned at varying offsets from the center of the base (1212, 1242)).

Figure 27E:
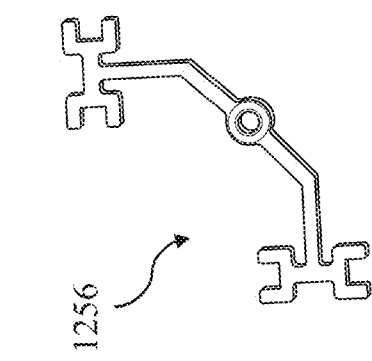
FIG. 27E shows a perspective view of yet another alternate exemplary flexure.

With reference to FIGS. 27A-27E and in the context of the design considerations for flexures, implementations of several MSMs were simulated with actuator pairs configured to provide identical force of the actuator in response to an identical control signal inputs (e.g., 120V at 100 Hz). In such simulations, the flexure (1234) of FIG. 27A provides a fiber tip displacement of 1.789 mm, due in part to thin and long arms (1235*a*, 1235*b*). The flexure (1204) of FIG. 27B provides a fiber tip displacement of 2 mm displacement. The flexure (1204) has substantially the same weight as the flexure (1234) of FIG. 27A, but allows for increased displacement due in part to the thin, long arms, and the offset position of the fiber tip relative to the junction of the arms. The flexure (1254) of FIG. 27C provides a fiber tip displacement of 1.25 mm. The flexure (1254) also provides a higher level of fatigue resistance as compared to the other depicted designs, due in part to the spring style arms. The flexure (1256) of FIG. 27D provides a fiber tip displacement of 96 μm. The flexure (1258) of FIG. 27E provides a fiber tip displacement of 1.7 mm. The flexure (1258) has substantially the same weight as the flexure (1256) of FIG. 27D, but is significantly more flexible due in part to the thin, spring style arms.

As can be seen from the simulations described above, the displacement capabilities of each flexure can be expressed as the maximum displacement of the fiber tip resulting from the same applied force, which may be referred to herein as a "displacement potential". Described in this way, the flexure (1234) of FIG. 27A has a displacement potential of 1.789 mm, while the flexure (1204) of FIG. 27B has a displacement potential of 2 mm, the flexure (1254) of FIG. 27C has a displacement potential of 1.25 mm, and the flexure (1258) of FIG. 27E has a displacement potential of 1.7 mm. In designing these flexures and others, this displacement potential may then be considered in addition to fatigue resistance in order to select a flexure appropriate for a particular application. As an example, a displacement potential of 2 mm may be desirable for some applications despite having only moderate fatigue resistance, such as where the MSMs are easily accessible to allow for inspection, maintenance, or replacement of flexures. In other applications, a flexure with displacement potential of 1.25 mm may allow for full processing of a cell while providing a high fatigue resistance, such as where inspection, maintenance, or replacement of flexures is not readily performed.

Figure 29:
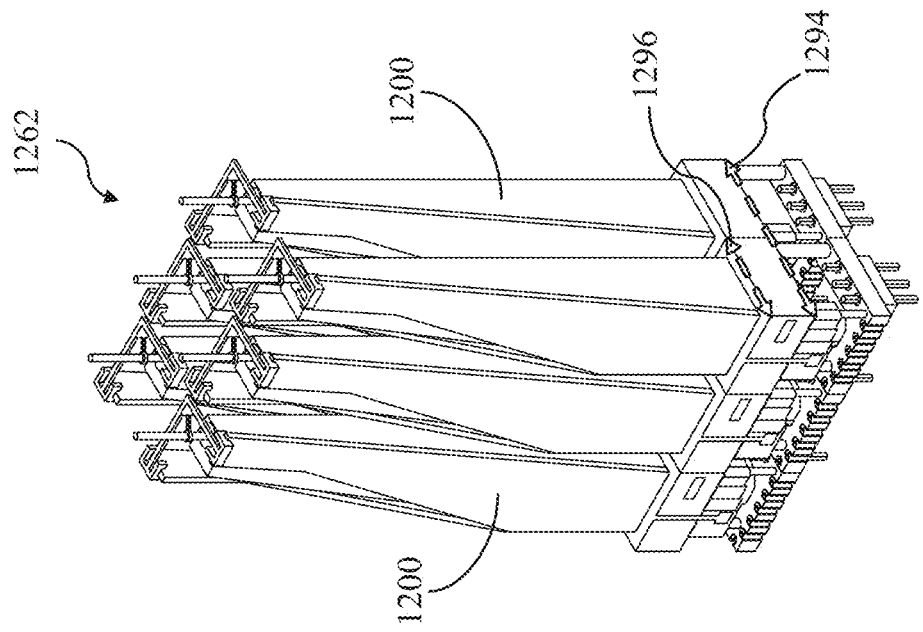
FIG. 29 shows a perspective view of an exemplary combination of six of the MSMs of FIG. 25A.
Figure 28:
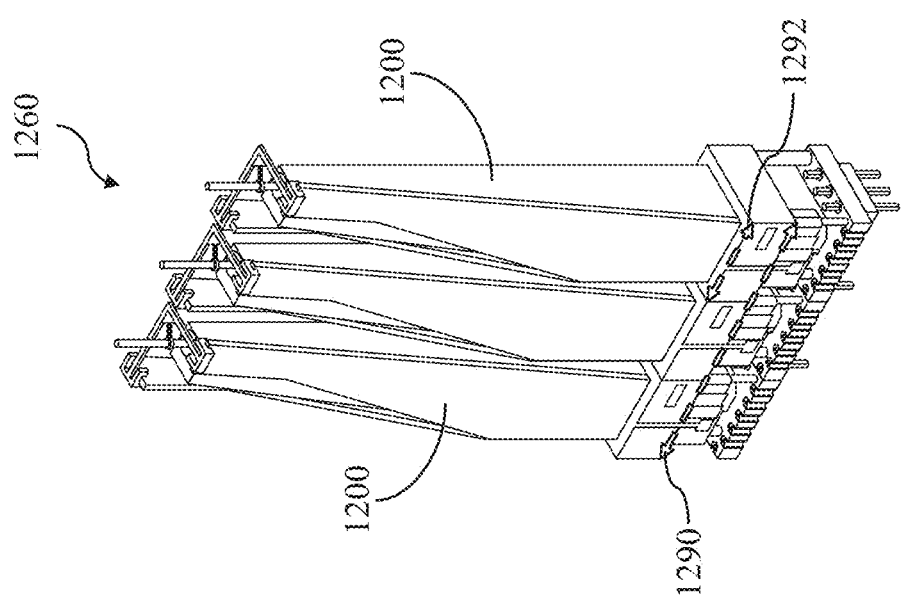
FIG. 28 shows a perspective view of an exemplary combination of three of the MSMs of FIG. 25A.

FIGS. 28 and 29 illustrate examples of the MSM (1200) assembled into a 1-by-3 array (1260) and a 2-by-3 matrix (1262). The array (1260) includes three MSMs (1200) that are densely packed together. Any shapes of packing for the array (1260) can be possible (e.g., triangular, rectangular, or other shapes). The bases can touch each other to result in a maximum density, or may be separated by any distance. In the possible embodiment shown in FIGS. 28 and 29, the actuators are bimorph piezoelectric plates which displace the fiber tip or a ferrule. In this example, an array of beam forming optical elements e.g. lenses (not pictured in FIGS. 28 and 29, but discussed in the context of the beam interface (1138) of FIG. 23) are located in front of the MSM array to focus the light on the build surface. The possible MSM array (1260) shown in FIGS. 28 and 29 are densely packed such the bases of each MSM are touching each other.

If the base of each MSM (1200) is a square with an edge length (1292) of 1 cm, then a length (1290) of the entire array (1260) is 3 cm and the area is 3 cm². Similarly, the matrix (1262) includes six MSMs (1200) that are densely packed together such that their bases are touching. With an edge width (1296) of 1 cm, the width of the matrix (1294) is 2 cm and the area of the matrix (1262) is 6 cm². While assembled pluralities of MSMs have been shown in configurations such as 3×3 and 2×3, it should be understood that matrices of varying sizes may be assembled as needed for particular implementations (e.g., 10×10 or more). Further, while MSMs have been shown arranged in linear columns and rows (e.g., such as in FIG. 29), it should be understood that MSMs may also be arranged in other patterns or shapes. As an example, there may be varying numbers of MSMs in each column or row, or the MSMs may be arranged in staggered or bricked rows (e.g., such that an edge of each base is centered on the bases in rows above and below). As used within this disclosure, a "matrix pattern" should be understood to include any arrangement of MSMs that has some aspect of multi-dimensionality that can be expressed in rows and columns, regardless of the shape, size, alignment (e.g., linearly aligned rows, bricked rows), such that simultaneous operation of the MSMs results in parallel processing within a plurality of adjacent or overlapping cells (e.g., such as the cell (1106)). While a matrix pattern will typically include at least 2 rows of MSMs and 2 columns of MSMs (e.g., four total MSMs), it is contemplated that a single row of MSMs is also possible, and would provide parallel processing of a plurality of adjacent or overlapping cells without requiring that the MSLB (1100) be scanned or repositioned during processing (e.g., a single row of cells could be processed while the MSLB (1100) is immobile, and then the MSLB (1100) may be repositioned and activated to process a subsequent row of cells).

Figure 30B:
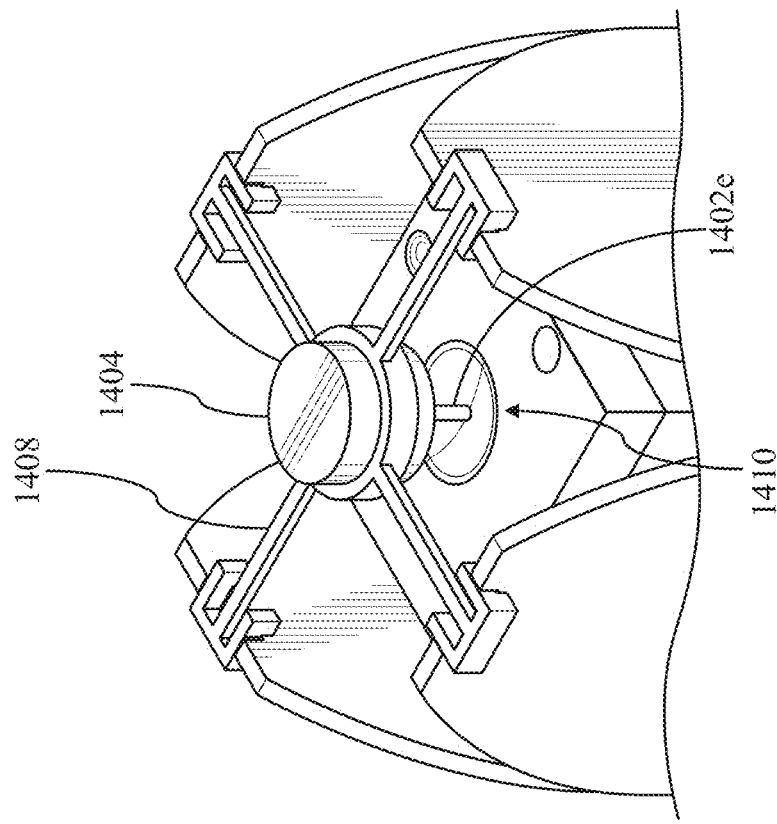
FIG. 30B shows a perspective view of a tip of the MSM of FIG. 30A showing an exemplary flexure.
Figure 30A:
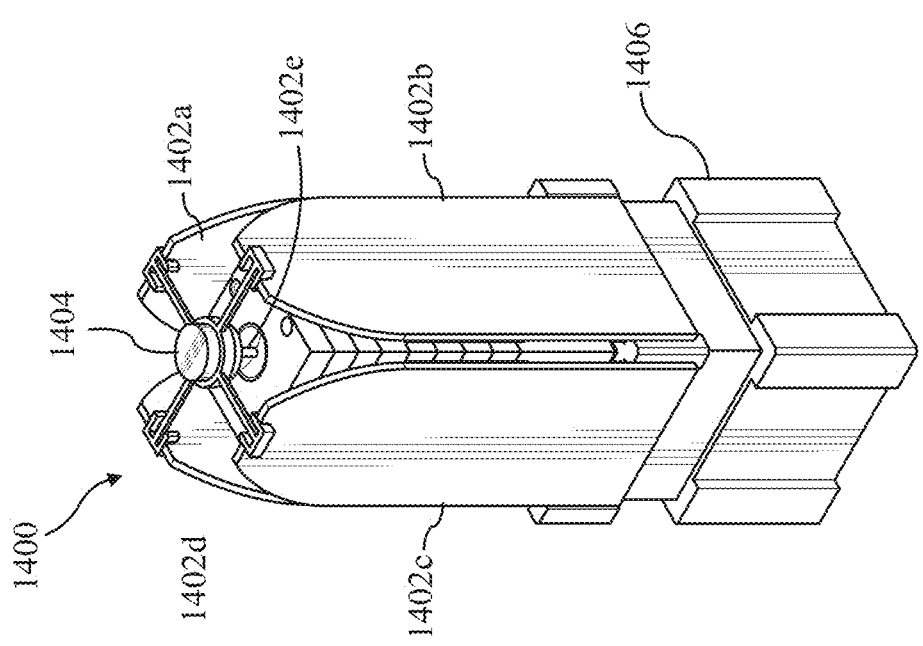
FIG. 30A shows a perspective view of yet another alternate exemplary MSM.

As has been discussed, a beam scanning element may function by changing the position of an origin of a laser beam (e.g., a fiber tip), changing the position of other optical elements in the MSM beam forming optics (e.g., a lens), or both. As an example, FIGS. 30A and 30B each show another alternate MSM (1400) with a beam scanning element that functions by changing the position of a lens located a distance from the fiber tip (1402e). The MSM (1400) includes a set of four piezo actuators (1402a, 1402b, 1402c, 1402d), and a flexure (1408) that attaches to each actuator and suspends a lens (1404) in the path of a statically positioned fiber tip (1402e) within a channel (1410). A base (1406) may contain circuitry and interface connectors, and also defines the footprint of the MSM (1400) to allow for a plurality of modules to be densely packed, as has been described. The actuators (1402a, 1402b, 1402c, 1402d) may be displaced based upon control signals in order to change the relative position of the lens (1404) and direct the resulting focal spot to a desired coordinate in order to scan the corresponding cell (1106). The lens (1404) may advantageously be implemented as a lightweight lens, such as a Fresnel lens, in order to reduce the lens mass that must be rapidly moved and scanned by the set of actuators (1402a, 1402b, 1402c, 1402d). The MSM (1400) may include a set of two piezo actuators e.g. (1402a, 1402b) or (1402c, 1402d), and a flexure (1408) that has only two arms as illustrated in FIG. 27 attaches to each of two actuator and suspends a lens (1404) in the path of a statically positioned fiber tip (1402e) within a channel (1410).

As another example of a beam scanning element, FIG. 31 shows a micro-motor based actuator flexure (1320) that may be incorporated into an MSM. In that figure, empty portions of the actuator flexure (1320) are shown with a dotted pattern, indicating that they are cutouts or voids. With reference to FIG. 23, an actuator flexure implementation could include a plurality of actuator flexures (1320) within the beam interface (1138), with each actuator flexure positioned below a corresponding module (1104). The modules (1104) in such an implementation would not require piezo actuators, and the fiber tip may transmit laser power linearly and without displacement. Rather, the actuator flexure (1320) would include a lens (1326) or other optical element that could be displaced along an x and y axis relative to the fiber tip or other laser beam origin. Thus, rather than changing the position of the fiber tip relative to a statically positioned lens, the position of the lens (1326) is changed relative to a statically positioned fiber tip. Alternately, the actuator flexure (1320) could be coupled to a fiber tip instead of the lens (1326), and could displace the fiber tip during laser beam scanning as has been described (e.g., a function similar to that of the MSM (1200) but with the actuator flexure (1320) providing displacement.

A body (1322) of the actuator flexure (1320) includes the lens (1326) mounted within a "floating" portion (1301) at the center of the flexure. The floating portion (1301) is flexibly held by a set of flex arms (1306a, 1306b, 1306c, 1306d) and is only coupled to the body at a mount (1304) on each side. The actuator flexure (1320) may be created from metals or polymers such that allow the flex arms (1306a, 1306b, 1306c, 1306d) bias the floating portion (1301) toward a neutral or origin position). An exemplary material suitable for the actuator flexure (1320) is aluminum 6061-T6. The actuator flexure (1320) includes two actuators (1328, 1330) that are operable to displace the floating portion (1301) along an x and y axis. The actuator may be implemented in varying ways, but may generally include piezoelectric elements that are small, lightweight, and have low operational power requirements. Examples of actuators may include piezo actuators, squiggle motors, linear actuators, and coils. An x-actuator (1328) and a y-actuator (1330) are mounted on the floating portion (1301), and may be mounted on the surface or within cutouts of the floating portion (1301). Other cutout portions of the floating surface (1301) may reduce the mass and corresponding motor power to cause displacement, and a set of cutouts may also be included that allow for the installation of additional actuators (e.g., two x-actuators (1328), two y-actuators (1330)). In some implementations the x-actuator (1328) and y-actuator (1330) may be a squiggle motor, which is a type of linear actuator that uses piezoelectric element to advance and retract a push rod or other contact member. In such implementations, the linearly actuated push rod may be coupled to the mount (1304) or another portion of the body (1322), or may be coupled to another static structure. In this manner, when the squiggle motor operates and advances or retracts the push rod, the floating portion (1301) will be correspondingly displaced as the flex arms flex. An exemplary squiggle motor may provide about 0.2N to about 0.4N of force and about 450 µm to about 600 µm of displacement along the x or y axis. In order to minimize mass placed on the floating portion (1301) or body (1322), a squiggle motor may be implemented with an actuating element that is coupled to the actuator flexure (1320), and a separate circuitry module that is supported by another proximate structure (e.g., an MSM tower, base, tip, etc.). Actuator flexures such as that described above may be implemented with varying shapes and features, similarly to the various flexures shown in FIGS. 27A-27E. As an example, FIG. 32 shows another alternate actuator flexure (1340) that includes a floating portion with a lens (1346) coupled to the body (1342) by another coil or spring style flex arm (1344). In the actuator flexure (1340), an x-motor (1348) and a y-motor (1350) are mounted to the body (1342) with a linearly actuating element (e.g., a push rod) being coupled to the floating portion. As with prior discussions of flexures, desirable characteristics for actuator flexures include high flexibility, low weight, and high fatigue resistance, and varying implementations of actuator flexures will have materials, shapes, arm types, and other features selected based on those characteristics.

Figure 33:
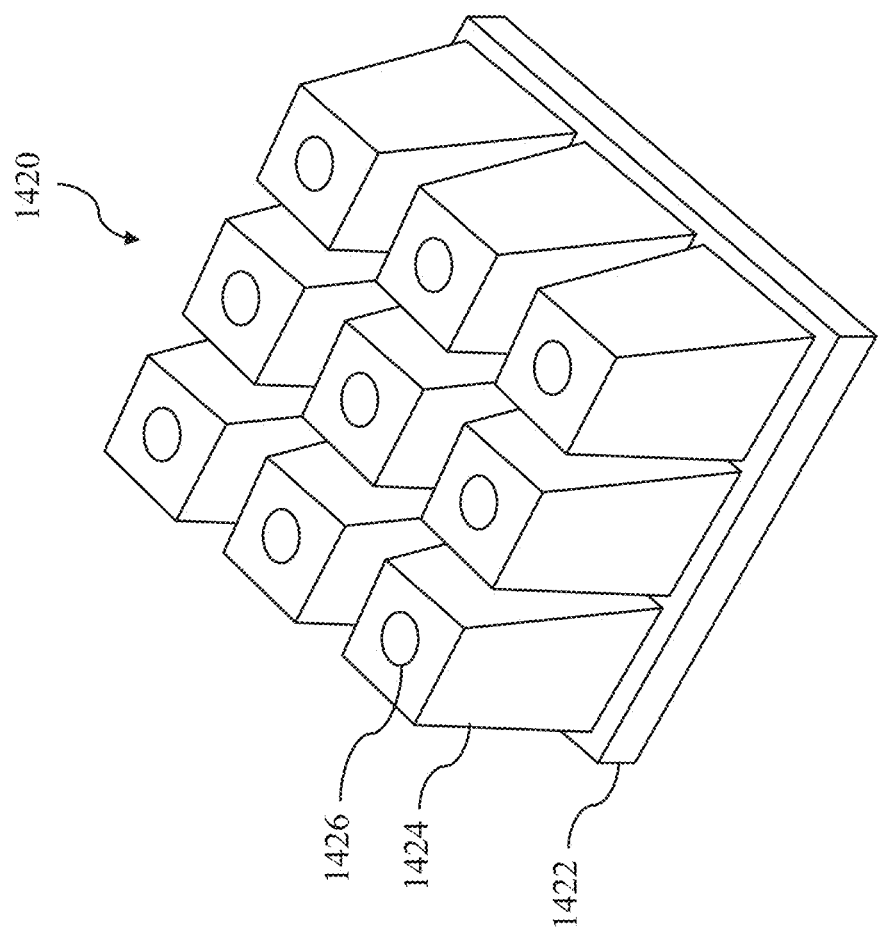
FIG. 33 shows a perspective view of an exemplary matrix frame.

FIG. 33 shows an integrated base (1420) that may be used with the MSLB (1100). With reference to FIG. 23, the integrated base (1420) includes components of the frame (1134) and the plurality of modules (1104). The integrated base (1420) may be created to support the desired matrix size (e.g., the frame of FIG. 33 provides a 3-by-3 matrix of MSMs), and incorporates a plurality of towers (1424) and channels (1426) mounted to a matrix base (1422). Rather than assembling a plurality of MSMs into a matrix by coupling their bases together adjacently (e.g., such as the MSMs (1104) and the matrix (1136)), the integrated base (1420) provides a unibody frame in which piezo actuators and/or delivery fibers may be installed.

Figure 34:
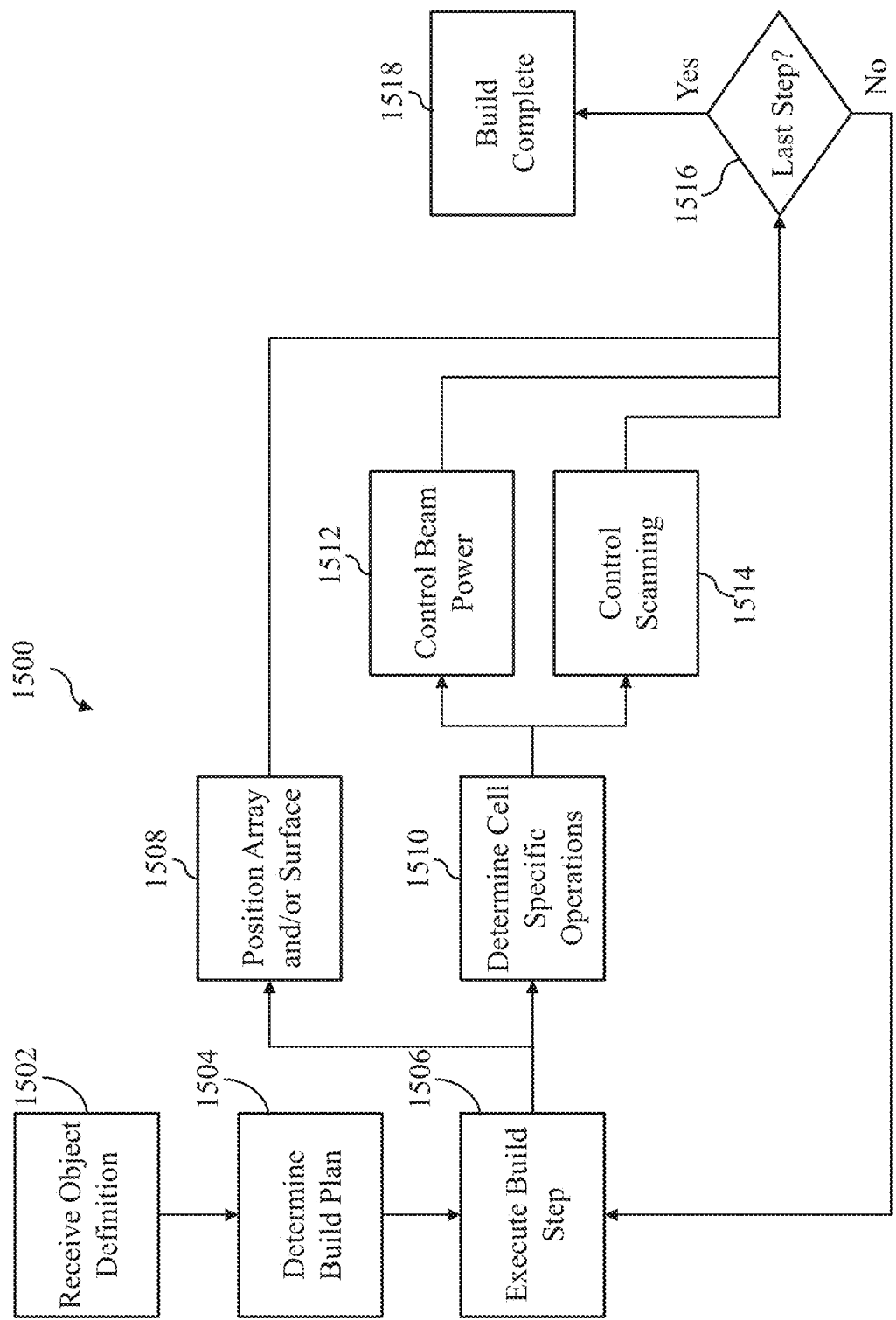
FIG. 34 shows a flowchart of a set of steps that may be performed by the MSLB of FIG. 20 during additive manufacturing.

FIG. 34 shows an example of a set of steps (1500) that may be performed during LPBF with a laser matrix such as the MSLB (1100). The steps (1500) may be performed by one or more processors or components of the LPBF system (1101) or another appropriate computing system. After an object definition is received (1502) the LPBF system (1101) may determine (1504) or create a build strategy that supports processing by a matrix of scanning laser beams. In conventional LPBF, an object definition may define a sequence of coordinates, across the processing region and for each layer, that are configured to cause the laser processing head to sequentially raster to and process each coordinate. A build strategy (1504) for the MSLB (1100) may include sequences of processing coordinates specific to each of the plurality of MSMs and their corresponding cells (1106). The build strategy may also include sequences of MSLB (1100) positions where the simultaneous processing region of the MSLB (1100) is less than the area of the workspace (e.g., the MSLB (1100) may process a first plurality of cells, be repositioned to a second plurality of cells, and then process the second plurality of cells). The build strategy may also include other processing characteristics, such as defining beam shaping methods, sensor feedback loops, laser power density, material pre-heating temperatures, and other similar information as has been described herein.

The system may then execute (1506) a sequence of build steps based on the build strategy. Build steps may include, for example, providing laser power and focal spot scanning to process a plurality of cells, positioning of the MSLB (1100), positioning of the build surface (1102), application of new powder layers, preheating of the build surface (1102) and/or powder layer, and other steps as have been described.

As an example, execution of a first build step may include the positioning system (1128) positioning (1508) the MSLB (1100) so that the MSM matrix (1136) is positioned over a first portion of the processing region. The module controller (1124), or another processor, may determine (1510) the specific processing operations for each cell (1106) within the first portion, and then control (1512) beam power provided by the laser source (1130) and scanning (1514) along the x and y axis by each module (1104) to process coordinates of powder within each cell (1106) that correspond to the determined (1510) processing operations for that cell (1106). Determination (1510) of processing operations for each cell (1106) may include using a lookup table or other data configuration to determine, for each processed coordinate within that cell, a corresponding piezoelectric control signal, micro-motor control signal, or other control signal to cause the laser beam scanning element to displace a fiber tip, a lens, or another component in order to direct the focal spot to that processed coordinate.

If the first build step is also the last step (1516), then the LPBF system (1101) may complete (1518) the build by withdrawing the MSLB (1100), removing the work piece from the powder layers, performing various heat management actions, or other actions as will be apparent to those of ordinary skill in the art in light of this disclosure. Where there are subsequent build steps (1516), the LPBF system (1101) may execute (1506) the next build step (e.g., in the case of the above example, a second build step). The second build step may include, for example, positioning (1508) of the MSLB (1100) and determination (1510) and processing of cells by each MSM, or may not require positioning (1508) where the build region is substantially the same area as that of the plurality of cells that can be simultaneously processed by the MSLB (1100). Powder application and pre-heating actions may occur during build steps or between build steps (1506), as has been described.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. An additive manufacturing system for processing a powder layer into a work piece, the system comprising:
   a laser beam scanning matrix including a plurality of micro scanner modules assembled in a matrix pattern having at least two rows and at least two columns, wherein each micro scanner module includes: a fiber tip; a lens positioned on an optical axis of the fiber tip; and a laser beam scanning element operable to selectively change the position of the fiber tip or the lens in at least two dimensions;
   a fiber laser source operable to selectively provide laser power to the fiber tips of the plurality of micro scanner modules;
   a build surface for the powder layer; and
   one or more processors configured to:
      receive an object definition that describes the work piece;
      determine, based on the object definition and for each of the plurality of micro scanner modules, a set of cell specific operations for processing the powder layer in a cell of the build surface that corresponds to that micro scanner module; and
      for each of the plurality of micro scanner modules, operate the fiber laser source and the laser beam scanning element based on the set of cell specific operations in order to process the powder layer within the corresponding cell for that micro scanner module.

2. The additive manufacturing system of claim 1, further comprising a positioning system operable to position the laser beam scanning matrix relative to the build surface, wherein the one or more processors is further configured to:
   process a first plurality of the cells of the build surface that correspond to each of the plurality of micro scanner modules when the laser beam scanning matrix and the build surface are in a first relative position;
   operate the positioning system to position the laser beam scanning matrix and the build surface in a second relative position; and
   process a second plurality of the cells of the build surface that correspond to each of the plurality of micro scanner modules when the laser beam scanning matrix and the build surface are in the second relative position.

3. The additive manufacturing system of claim 1, wherein:
   each micro scanner module further comprises a base having a first dimensional length and a second dimensional length; and
   the plurality of micro scanner modules are assembled in the matrix pattern so that each base is in contact with at least one other base, and an area of the matrix pattern is the product of the first dimensional length, the second dimensional length, and the number of the plurality of micro scanner modules.

4. The additive manufacturing system of claim 3, wherein an area of each corresponding cell is the product of the first dimensional length and the second dimensional length.

5. The additive manufacturing system of claim 4, wherein the laser beam scanning element of each of the plurality of micro scanner modules is configured to, based upon control signals, move a focal spot projected from the fiber tip onto the build surface along an x-axis and a y-axis to any coordinate within the area of the corresponding cell.

6. The additive manufacturing system of claim 1, wherein the laser beam scanning element comprises:
   a flexure coupled to an x-actuator, a y-actuator, and the fiber tip, the flexure adapted to flexibly bias the fiber tip to a neutral position;
   the x-actuator configured to displace the fiber tip in either direction along an x-axis in response to control signals; and
   the y-actuator configured to displace the fiber tip in either direction along a y-axis in response to control signals.

7. The additive manufacturing system of claim 6, further comprising an interface surface including a plurality of lenses positioned between the plurality of micro scanner modules and the build surface, wherein the lenses of the plurality of micro scanner modules are held in a static position by the lens interface surface.

8. The additive manufacturing system of claim 6, wherein the flexure is configured to have a displacement potential of at least 2 mm.

9. The additive manufacturing system of claim 8, wherein the flexure comprises a pair of long thin arms; and wherein a coupling of the flexure is offset from an intersection of the arms.

10. The additive manufacturing system of claim 6, wherein the flexure is configured to have a displacement potential of at least 1.7 mm.

11. The additive manufacturing system of claim 10, wherein the shape of the flexure comprises a pair of spring arms.

12. The additive manufacturing system of claim 1, wherein the fiber tip is statically positioned, and wherein the laser beam scanning element is operable to selectively change the position of the lens in at least two dimensions.

13. The additive manufacturing system of claim 12, wherein the laser beam scanning element comprises an actuator flexure that includes:
   a floating portion held by a set of flex arms within a base, and a lens holder, wherein the set of flex arms flexibly bias the floating portion to a neutral position and the lens holder holds the lens;
   an x-actuator configured to displace the floating portion in either direction along an x-axis in response to control signals; and
   a y-actuator configured to displace the floating portion in either direction along a y-axis in response to control signals.

14. The additive manufacturing system of claim 13, wherein each of the x-actuator and the y-actuator comprise a linear actuator that is coupled to the floating portion and the base.

15. A method for additive manufacturing comprising:
   positioning a laser beam scanning matrix relative to a build surface, wherein the laser beam scanning matrix includes a plurality of micro scanner modules assembled in a matrix pattern having at least two rows and at least two columns, wherein each micro scanner module includes: a fiber tip; a lens positioned on an optical axis of the fiber tip; and a laser beam scanning element operable to selectively change the position of the fiber tip or the lens in at least two dimensions;
   determining, based on an object definition for a work piece, and for each of the plurality of micro scanner modules, a set of cell specific operations for processing a powder layer in a cell of the build surface that corresponds to that micro scanner module;
   operating a fiber laser source to selectively provide laser power to the fibers tips of the plurality of micro scanner modules; and for each of the plurality of micro scanner modules, operating the laser beam scanning element based on the set of cell specific operations in order to process the powder layer within the corresponding cell for that micro scanner module.

16. The method of claim 15, wherein:

each micro scanner module further comprises a base having a first dimensional length and a second dimensional length; and the plurality of micro scanner modules are assembled in the matrix pattern so that each base is in contact with at least one other base, and an area of the matrix pattern is the product of the first dimensional length the second dimensional length, and the number of the plurality of micro scanner modules.

17. The method of claim 15, wherein operating the laser beam scanning element comprises:

providing control signals to an x-actuator to displace the fiber tip in either direction along an x-axis; and providing control signals to a y-actuator to displace the fiber tip in either direction along a y-axis in response to control signals.

18. The method of claim 17, wherein a flexure couples the x-actuator and the y-actuator to the fiber tip, the method further comprising selecting a set of characteristics of the flexure to provide a displacement potential of at least 2 mm.

19. The method of claim 15, wherein operating the laser beam scanning element comprises:

providing control signals to an x-actuator to displace the lens in either direction along an x-axis; and providing control signals to a y-actuator to displace the lens in either direction along a y-axis in response to control signals.

20. A laser beam scanning matrix comprising a plurality of micro scanner modules assembled in a matrix pattern having at least two rows or at least two columns, wherein each micro scanner module includes:

a fiber tip;

a lens positioned on an optical axis of the fiber tip;

a laser beam scanning element operable to selectively change the position of the fiber tip or the lens in at least two dimensions; and a base that defines a footprint of the micro scanner module; and a control circuit configured to:

receive control signals; and operate the laser beam scanning element to displace a focal spot projected by the fiber tip to an x-y coordinate of a processing cell, wherein an area of the processing cell corresponds to an area of the footprint of the micro scanner module.

* * * * *